(12) United States Patent
Chan

(10) Patent No.: US 11,448,373 B1
(45) Date of Patent: Sep. 20, 2022

(54) PHOTOSENSITIVE CANDLE

(71) Applicant: Lap Chi Chan, Hong Kong (CN)

(72) Inventor: Lap Chi Chan, Hong Kong (CN)

( * ) Notice: Subject to any disclaimer, the term of this patent is extended or adjusted under 35 U.S.C. 154(b) by 0 days.

(21) Appl. No.: 17/445,498

(22) Filed: Aug. 20, 2021

(51) Int. Cl.
| | |
|---|---|
| *F21S 6/00* | (2006.01) |
| *H05B 47/11* | (2020.01) |
| *F21S 10/04* | (2006.01) |
| *G02B 6/00* | (2006.01) |
| *F21V 8/00* | (2006.01) |
| *F21W 121/00* | (2006.01) |

(52) U.S. Cl.
CPC ............. *F21S 6/001* (2013.01); *F21S 10/043* (2013.01); *G02B 6/0095* (2013.01); *H05B 47/11* (2020.01); *F21V 2200/13* (2015.01); *F21W 2121/00* (2013.01)

(58) Field of Classification Search
None
See application file for complete search history.

(56) References Cited

U.S. PATENT DOCUMENTS

| | | | |
|---|---|---|---|
| 4,477,249 A | 10/1984 | Ruzek et al. | |
| 2006/0177786 A1* | 8/2006 | Hu ........................ | F21S 19/00 431/126 |
| 2007/0003894 A1* | 1/2007 | Yu ....................... | F21V 23/0442 431/126 |

FOREIGN PATENT DOCUMENTS

| | | |
|---|---|---|
| CN | 2462235 Y | 11/2001 |
| CN | 205535250 U | 8/2016 |
| CN | 108463668 A | 8/2018 |
| CN | 209054487 U | 7/2019 |
| CN | 211170633 U | 8/2020 |
| JP | 2007121732 A | 5/2007 |
| JP | 3177575 U | 8/2012 |
| WO | 2014184217 A1 | 11/2014 |

* cited by examiner

*Primary Examiner* — Dedei K Hammond
(74) *Attorney, Agent, or Firm* — Eagle IP Limited; Jacqueline C. Lui; Jennifer G. Che

(57) ABSTRACT

One example embodiment is a photosensitive candle comprising: (a) a candle container comprising an opening; (b) a candle component disposed in the candle container, comprising: a candle body having a surface proximate to or substantially aligned with the opening; a wick with an exposed portion protruding out of the surface of the candle body; and an optical fiber embedded in the candle body and positioned juxtapose to the wick for transmitting flame lights of the wick, wherein the optical fiber comprises a first end proximate to the exposed portion of the wick and an opposing second end; (c) a lighting control component disposed in the candle container, comprising: a casing comprising an interior cavity; a controller and a power source disposed within the interior cavity; and a light sensor connected to the controller, comprising a photosensitive element proximate to the second end of the optical fiber to detect light transmitted therefrom; and (d) at least one light-emitting device connected to the controller. In some embodiments, the controller is configured to receive light signals associated with the flame lights of the wick from the light sensor, and control the at least one light-emitting device based on the received light signals.

20 Claims, 9 Drawing Sheets

PHOTOSENSITIVE CANDLE

FIELD OF INVENTION

This invention relates to a candle, and in particular to a photosensitive candle with a candle, a light-emitting device and a lighting control component which controls illumination of the light-emitting device when the candle is lit.

BACKGROUND OF INVENTION

Conventional wax candles are no longer a main source of illumination in modern society. However, wax candles are still widely used as decorations in many occasions such as art performances, family parties and wine bars to create a pleasant environment.

Electronic candles that mimic real candle flame effects were developed as an alternative to the conventional candles. Although an electronic candle may provide certain flame simulating effects, it still cannot achieve the authentic and artistic visual effect of a natural flame that a conventional wax candle offers.

SUMMARY OF INVENTION

In the light of the foregoing background, in certain embodiments, it is an object to provide a unique candle that provides an improved visual effect.

Accordingly, an exemplary embodiment of the invention is a photosensitive candle comprising: (a) a candle container comprising an opening; (b) a candle component disposed in the candle container, comprising: a candle body having a surface proximate to or substantially aligned with the opening; a wick with an exposed portion protruding out of the surface of the candle body; and an optical fiber embedded in the candle body and positioned juxtapose to the wick for transmitting flame lights of the wick, wherein the optical fiber comprises a first end proximate to the exposed portion of the wick and an opposing second end; (c) a lighting control component disposed in the candle container, comprising: a casing comprising an interior cavity; a controller and a power source disposed within the interior cavity; and a light sensor connected to the controller, comprising a photosensitive element proximate to the second end of the optical fiber to detect light transmitted therefrom; and (d) at least one light-emitting device connected to the controller. The controller is configured to: (i) receive light signals associated with the flame lights of the wick from the light sensor; (ii) switch the at least one light-emitting device from an OFF state to an ON state if an intensity of the light signals is greater than a predetermined upper threshold; (iii)maintain the at least one light-emitting device in the ON state if the at least one light-emitting device is in the ON state and the intensity of the light signals is greater than a predetermined lower threshold; (iv) switch the at least one light-emitting device from the ON state to the OFF state if the intensity of the light signals is lesser than the predetermined lower threshold for a predetermined period of time; and (v)maintain the at least one light-emitting device in the OFF state if the at least one light-emitting device is in the OFF state and the intensity of the light signals is lesser than the predetermined upper threshold.

In another exemplary embodiment, provided is a photosensitive candle, comprising: (a) a candle container comprising a candle container base and a candle container opening opposite the candle container base; (b) an inner container housed within the candle container, comprising an inner container base and an inner container opening opposite the inner container base; (c) a candle component disposed in the inner container, comprising: a candle body filled within the inner container, having a top surface proximate to or substantially aligned with the inner container opening; a wick with an exposed portion protruding out of the top surface of the candle body; and an optical fiber embedded in the candle body and positioned juxtapose to the wick for transmitting flame lights of the wick, wherein the optical fiber comprises a first end proximate to the exposed portion of the wick and an opposing second end; (d) a lighting control component disposed in the candle container, comprising: a casing attached to the candle container base and positioned below the inner container base, comprising an interior cavity; a controller disposed within the interior cavity; a power source connected with the controller and disposed within the interior cavity; and a light sensor connected to the controller, comprising a photosensitive element protruding outwardly from the casing towards the inner container base, wherein the photosensitive element is positioned proximate to the second end of the optical fiber to detect light transmitted therefrom; (e) at least one light-emitting device with a connecting end and a main body, wherein the connecting end is connected to the controller and the main body extends out of the casing and the candle container; and (f) a light guiding channel attached to a defined area of the inner container base, comprising: a first portion disposed within the inner container, configured to accommodate a part of the wick and the second end of the optical fiber; and a second portion disposed outside the inner container and extending away from the inner container base, configured to accommodate at least a part of the photosensitive element of the light sensor; wherein the second end of the optical fiber and the photosensitive element are separated from each other by the defined area of the inner container base, and wherein the defined area is made of substantially transparent material, and the first portion and the second portion are substantially aligned with each other, such that the light transmitted from the optical fiber are detectable by the photosensitive element. The controller is configured to receive light signals associated with the flame lights of the wick from the light sensor, and control the at least one light-emitting device based on the received light signals.

In another exemplary embodiment, provided is a photosensitive candle, comprising: (a) a shell component including: an outer-shell comprising an outer-shell base; an inner-shell comprising an inner-shell base, wherein the inner-shell is housed within the outer-shell with the inner-shell base disposed on top of the outer-shell base; a filling that fills in a space between the inner-shell and the outer-shell; (b) a candle container comprising a candle container base and a candle container opening opposite the candle container base, wherein the candle container is configured to be removably accommodated within the inner-shell with the candle container base disposed on top of the inner-shell base; (c) an inner container housed within the candle container, comprising an inner container base and an inner container opening opposite the inner container base; (d) a candle component disposed in the inner container, comprising: a candle body filled within the inner container, having a top surface proximate to or substantially aligned with the inner container opening; a wick with an exposed portion protruding out of the top surface of the candle body; and an optical fiber embedded in the candle body and positioned juxtapose to the wick for transmitting flame lights of the wick, wherein the optical fiber comprises a first end proximate to the exposed portion of the wick and an opposing second end; (e)

a lighting control component disposed in the candle container, comprising: a casing attached to the candle container base and positioned below the inner container base, comprising an interior cavity; a controller disposed within the interior cavity; a power source connected with the controller and disposed within the interior cavity; and a light sensor connected to the controller, comprising a photosensitive element protruding outwardly from the casing towards the inner container base, wherein the photosensitive element is positioned proximate to the second end of the optical fiber to detect light transmitted therefrom; (f) at least one light-emitting device with a connecting end and a main body, wherein the connecting end is connected to the controller and the main body extends out of the casing, the candle container and the inner-shell and is partially embedded in the filling; and (g) a light guiding channel attached to a defined area of the inner container base, comprising: a first portion disposed within the inner container, configured to accommodate a part of the wick and the second end of the optical fiber; and a second portion disposed outside the inner container and extending away from the inner container base, configured to accommodate at least a part of the photosensitive element of the light sensor; wherein the second end of the optical fiber and the photosensitive element are separated from each other by the defined area of the inner container base, and wherein the defined area is made of substantially transparent material, and the first portion and the second portion are substantially aligned with each other, such that the light transmitted from the optical fiber are detectable by the photosensitive element. The controller is configured to receive light signals associated with the flame lights of the wick from the light sensor, and control the at least one light-emitting device based on the received light signals.

Other example embodiments are discussed herein.

There are various advantages in the various embodiments. For instance, in some embodiments, the photosensitive candle comprises a combustible candle component comprising a wick and an optical fiber, a light-emitting device and a light control component. A flame light of the wick can be transmitted by the optical fiber to the light sensor to generate light signals, which in turn are passed to the controller of the light control component to control the light-emitting device based on the intensity of the received light signals. As such, the light-emitting device can be switched on/off, change its luminescence and/or change its light pattern in response to the fluctuation of the flame light of the wick without the need of any manual operation, thereby combining the visual effect of a natural candle flame with the dynamic illumination of the light-emitting device to provide a unique aesthetic experience. As the light-emitting device will be switched off automatically when the wick flame is extinguished, the power of the battery in the photosensitive candle can be saved.

In some embodiments, the candle component is housed in an inner container and separated from the casing of the lighting control component, thereby preventing the wick flame and/or the molten wax of the candle component from reaching the casing and heating the electronic components housed within the casing. This avoids over-heating the light control component and causing smoke or even fire hazards, thereby improving the safety when using the photosensitive candle.

In some embodiments, the controller is configured to control the light-emitting device such that when the candle component is lit, a higher intensity of light is required to switch on the light-emitting device, whereas when the candle component is burning normally, the light-emitting device will be switched off only when the intensity of light reduces to a lower value, thereby avoiding the constant switching on/off of the light-emitting device and maintaining the stability of the illumination of the light-emitting device during use.

In some embodiments, the light-emitting device may be switched from an ON state to an OFF state only if the intensity of the light signals is lesser than a predetermined lower threshold for a predetermined period of time, thereby avoiding undesirable switching off of the light-emitting device when the flame light of the wick are temporarily diminished (but not extinguished) by a disturbance of airflow around the photosensitive candle. As such, the light-emitting device can illuminate stably and continuously.

In some embodiments, the candle container is removable from the inner-shell of the shell component. As such, it is convenient to replace the candle container after the candle component is used up while the shell component is reusable for a long period of time, thereby offering a cost-effective and environmental friendlier solution for using the photosensitive candle. Moreover, in some embodiments, the removable candle containers with different designs/color can mix and match with different types of shell components, thereby offering a wide variety of combinations according to the user's preference.

In some embodiments, the interior cavity of the casing is accessible by a user, therefore the power source (e.g. batteries) of the light control component can be replaced without the need to dispose the entire photosensitive candle after use, making it more environmental friendly to use.

DETAILED DESCRIPTION

Figure 1A:
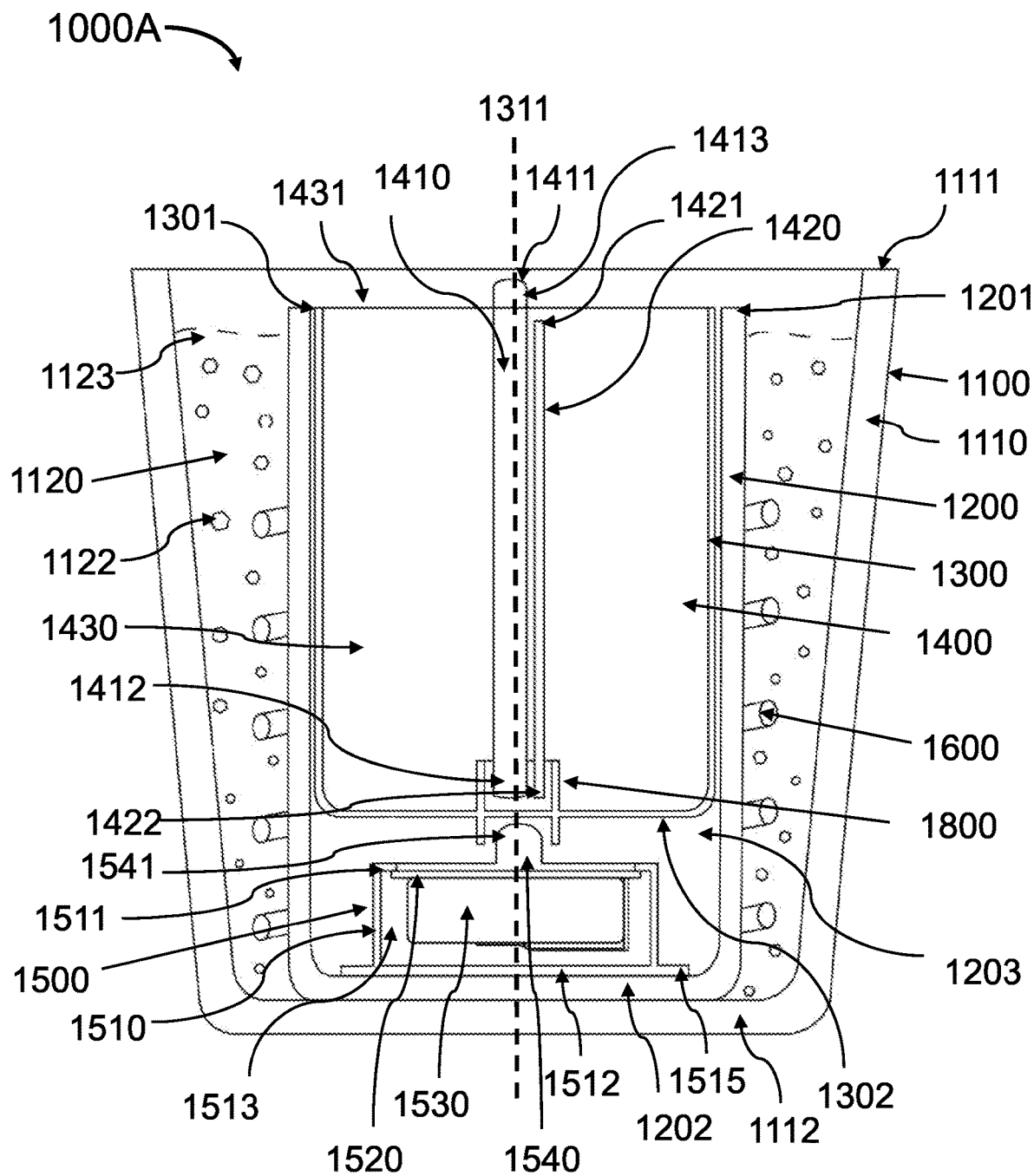
Fig. 1A is a schematic cross-sectional view of a photosensitive candle according to an example embodiment.

As used herein and in the claims, "comprising" means including the following elements but not excluding others.

As used herein and in the claims, "couple" or "connect" refers to electrical coupling or connection either directly or indirectly via one or more electrical means unless otherwise stated.

As used herein and in the claims, the terms "general" or "generally", or "substantial" or "substantially" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" rectangular shape would mean that the object has either an exact rectangular shape or a nearly exact rectangular shape. In another example, an object that is "substantially" perpendicular to a surface would mean that the object is either exactly perpendicular to the surface or nearly exactly perpendicular to the surface, e.g., has a 5% deviation.

As used herein and in the claims, the term "attach" refers to direct or indirect physical joining one component to another.

As used herein and in the claims, the term "light-emitting device" refers to any device that is configured to emit light or having a light-emitting element or the like, including but not limited to a light emitting diode (LED), a light strip, a light bulb, a light ring, a light block, a light string and a light tube.

As used herein and in the claims, the term "ON state" refers to a state of the at least one light-emitting device in which the light-emitting device is turned on and lights up.

As used herein and in the claims, the term "OFF state" refers to a state of the at least one light-emitting device in which the light-emitting device is turned off and does not light up.

As used herein and in the claims, the term "light signal" refers to signal generated by a light sensor in response to light emitted from a light source. For example, in some embodiments, "light signals" associated with a flame light of the wick refers to light signals generated by a light sensor in response to light created by burning of a wick of a candle component.

As used herein and in the claims, the term "illumination" refers to the luminescence or light pattern of a light source. For example, in some embodiments, "illumination" of the at least one light-emitting device refers to the luminescence (e.g. brightness, light output, color temperature, etc.) or light pattern (e.g. light mode, change of color, frequency of flashing the light, etc.) of the light-emitting device.

As used herein and in the claims, the term "transparent" means at least partially optically clear and having the property of allowing certain amount of light rays transmitting through its substance. The amount of light rays that is transmissible can be determined according to the user's application.

As used herein and in the claims, the term "ignition temperature" refers to the lowest temperature at which a substance catches fire.

It is to be understood that terms such as "top", "bottom", "middle", "side", "length", "inner", "outer", "interior", "exterior", "center" and the like as may be used herein, merely describe points of reference and do not limit the present invention to any particular orientation or configuration. Further, terms such as "first," "second," "third," etc., merely identify one of a number of portions, components and/or points of reference as disclosed herein, and likewise do not limit the present invention to any particular configuration or orientation.

In some embodiments, provided is a photosensitive candle comprising: (a) a candle container comprising an opening; (b) a candle component disposed in the candle container, comprising: a candle body having a surface proximate to or substantially aligned with the opening; a wick with an exposed portion protruding out of the surface of the candle body; and an optical fiber embedded in the candle body and positioned juxtapose to the wick for transmitting flame lights of the wick, wherein the optical fiber comprises a first end proximate to the exposed portion of the wick and an opposing second end; (c) a lighting control component disposed in the candle container, comprising: a casing comprising an interior cavity; a controller and a power source disposed within the interior cavity; and a light sensor connected to the controller, comprising a photosensitive element proximate to the second end of the optical fiber to detect light transmitted therefrom; and (d) at least one light-emitting device connected to the controller. The controller is configured to: (i) receive light signals associated with the flame lights of the wick from the light sensor; (ii) switch the at least one light-emitting device from an OFF state to an ON state if an intensity of the light signals is greater than a predetermined upper threshold; (iii) maintain the at least one light-emitting device in the ON state if the at least one light-emitting device is in the ON state and the intensity of the light signals is greater than a predetermined lower threshold; (iv) switch the at least one light-emitting device from the ON state to the OFF state if the intensity of the light signals is lesser than the predetermined lower threshold for a predetermined period of time; and (v) maintain the at least one light-emitting device in the OFF state if the at least one light-emitting device is in the OFF state and the intensity of the light signals is lesser than the predetermined upper threshold.

In some embodiments, the lighting control component further comprises an analog-digital converting module connected to the controller, wherein the analog-digital converting module is configured to (i) analyze and process the light signals to generate digital signals, wherein the digital signals represent the intensity of the light signals, and (ii) transmit the digital signals to the controller, wherein the controller is further configured to control an illumination of the at least one light-emitting device based on the digital signals received from the analog-digital converting module when the at least one light-emitting device is in the ON state.

In some embodiments, the lighting control component further comprises a memory that stores a preset program, and the controller is further configured to control an illumination of the at least one light-emitting device based on the preset program when the at least one light-emitting device is in the ON state.

In some embodiments, the predetermined period of time is between 1 seconds to 6 seconds.

In some embodiments, the candle container further comprises a candle container base opposite the opening, and the photosensitive candle further comprises a shell component including: an outer-shell comprising an outer-shell base, wherein the outer-shell is configured to accommodate the candle container with the candle container base disposed on top of the outer-shell base; and a filling that fills in a space between the candle container and the outer-shell. The at least one light-emitting device comprises a main body extending out of the casing and the candle container and is at least partially embedded in the filling.

In some embodiments, the photosensitive candle further comprises an outer-shell hole formed on the outer-shell base; a candle container hole formed on the candle container base; a casing hole formed on the casing; and a removable cover for covering the outer-shell hole. The outer-shell hole, the candle container hole and the casing hole are substantially aligned with each other such that the interior cavity of the casing is accessible by a user when the removable cover is opened.

In some embodiments, the candle container further comprises a candle container base opposite the opening, and the photosensitive candle further comprises a shell component including: an outer-shell comprising an outer-shell base; an inner-shell comprising an inner-shell base, wherein the inner-shell is housed within the outer-shell with the inner-shell base disposed on top of the outer-shell base, and the inner-shell is configured to removably accommodate the candle container with the candle container base disposed on top of the inner-shell base; and a filling that fills in a space between the inner-shell and the outer-shell. The at least one light-emitting device comprises a main body extending out of the casing, the candle container and the inner-shell and is partially embedded in the filling.

In some embodiments, the photosensitive candle further comprises a candle container hole formed on the candle container base; a casing hole formed on the casing; and a removable cover for covering the candle container hole. The candle container hole and the casing hole are substantially aligned with each other, such that the interior cavity of the casing is accessible by a user when the candle container is removed from the inner-shell and the removable cover is opened.

In some embodiments, the photosensitive candle further comprises an inner container housed within the candle container, comprising an inner container base positioned above the casing of the lighting control component, wherein the candle component is disposed within the inner container; a light guiding channel attached to a defined area of the inner container base, comprising: a first portion disposed within the inner container, configured to accommodate a part of the wick and the second end of the optical fiber; and a second portion disposed outside the inner container and extending away from the inner container base, configured to accommodate at least a part of the photosensitive element of the light sensor. The second end of the optical fiber and the photosensitive element are separated from each other by the defined area of the inner container base, and the defined area is made of substantially transparent material, and the first portion and the second portion are substantially aligned with each other, such that the light transmitted from the optical fiber are detectable by the photosensitive element.

In some embodiments, the at least one light-emitting device comprises at least two light strings with different colors.

In another exemplary embodiment, provided is a photosensitive candle, comprising: (a) a candle container comprising a candle container base and a candle container opening opposite the candle container base; (b) an inner container housed within the candle container, comprising an inner container base and an inner container opening opposite the inner container base; (c) a candle component disposed in the inner container, comprising: a candle body filled within the inner container, having a top surface proximate to or substantially aligned with the inner container opening; a wick with an exposed portion protruding out of the top surface of the candle body; and an optical fiber embedded in the candle body and positioned juxtapose to the wick for transmitting flame lights of the wick, wherein the optical fiber comprises a first end proximate to the exposed portion of the wick and an opposing second end; (d) a lighting control component disposed in the candle container, comprising: a casing attached to the candle container base and positioned below the inner container base, comprising an interior cavity; a controller disposed within the interior cavity; a power source connected with the controller and disposed within the interior cavity; and a light sensor connected to the controller, comprising a photosensitive element protruding outwardly from the casing towards the inner container base, wherein the photosensitive element is positioned proximate to the second end of the optical fiber to detect light transmitted therefrom; (e) at least one light-emitting device with a connecting end and a main body, wherein the connecting end is connected to the controller and the main body extends out of the casing and the candle container; and (f) a light guiding channel attached to a defined area of the inner container base, comprising: a first portion disposed within the inner container, configured to accommodate a part of the wick and the second end of the optical fiber; and a second portion disposed outside the inner container and extending away from the inner container base, configured to accommodate at least a part of the photosensitive element of the light sensor; wherein the second end of the optical fiber and the photosensitive element are separated from each other by the defined area of the inner container base, and wherein the defined area is made of substantially transparent material, and the first portion and the second portion are substantially aligned with each other, such that the light transmitted from the optical fiber are detectable by the photosensitive element. The controller is configured to receive light signals associated with the flame lights of the wick from the light sensor, and control the at least one light-emitting device based on the received light signals.

In some embodiments, the controller is further configured to: (i) switch the at least one light-emitting device from an OFF state to an ON state if an intensity of the light signals is greater than a predetermined upper threshold; (ii) once the at least one light-emitting device is switched to the ON state, maintain the at least one light-emitting device in the ON state if the intensity of the light signals is greater than a predetermined lower threshold; (iii) if the intensity of the light signals becomes lesser than the predetermined lower threshold when the at least one light-emitting device is in the ON state, start a timer to measure a length of time in which the intensity of the light signals is lesser than the predetermined lower threshold; and if the length of time is shorter than a predetermined period of time, maintain the at least one light-emitting device in the ON state; if the length of time is longer than the predetermined period of time, switch the at least one light-emitting device from the ON state to the OFF state; and (iv) once the at least one light-emitting device is switched to the OFF state, maintain the at least one light-emitting device in the OFF state if the intensity of the light signals is lesser than the predetermined upper threshold.

In some embodiments, the photosensitive candle further comprises a shell component including: an outer-shell comprising an outer-shell base, wherein the outer-shell is configured to accommodate the candle container with the candle container base disposed on top of the outer-shell base; and a filling that fills in a space between the candle container and the outer-shell, wherein the main body of the at least one light-emitting device is at least partially embedded in the filling.

In some embodiments, the photosensitive candle further comprises a shell component including: an outer-shell comprising an outer-shell base; an inner-shell comprising an inner-shell base, wherein the inner-shell is housed within the outer-shell with the inner-shell base disposed on top of the outer-shell base, and the inner-shell is configured to removably accommodate the candle container with the candle container base disposed on top of the inner-shell base; and a filling that fills in a space between the inner-shell and the outer-shell, wherein the at least one light-emitting device comprising a main body extending out of the casing, the candle container and the inner-shell and is at least partially embedded in the filling.

In some embodiments, provided is a photosensitive candle, comprising: (a) a shell component including: an outer-shell comprising an outer-shell base; an inner-shell comprising an inner-shell base, wherein the inner-shell is housed within the outer-shell with the inner-shell base disposed on top of the outer-shell base; a filling that fills in a space between the inner-shell and the outer-shell; (b) a candle container comprising a candle container base and a candle container opening opposite the candle container base, wherein the candle container is configured to be removably accommodated within the inner-shell with the candle container base disposed on top of the inner-shell base; (c) an inner container housed within the candle container, comprising an inner container base and an inner container opening opposite the inner container base; (d) a candle component disposed in the inner container, comprising: a candle body filled within the inner container, having a top surface proximate to or substantially aligned with the inner container opening; a wick with an exposed portion protruding out of the top surface of the candle body; and an optical fiber embedded in the candle body and positioned juxtapose to the wick for transmitting flame lights of the wick, wherein the optical fiber comprises a first end proximate to the exposed portion of the wick and an opposing second end; (e) a lighting control component disposed in the candle container, comprising: a casing attached to the candle container base and positioned below the inner container base, comprising an interior cavity; a controller disposed within the interior cavity; a power source connected with the controller and disposed within the interior cavity; and a light sensor connected to the controller, comprising a photosensitive element protruding outwardly from the casing towards the inner container base, wherein the photosensitive element is positioned proximate to the second end of the optical fiber to detect light transmitted therefrom; (f) at least one light-emitting device with a connecting end and a main body, wherein the connecting end is connected to the controller and the main body extends out of the casing, the candle container and the inner-shell and is partially embedded in the filling; and (g) a light guiding channel attached to a defined area of the inner container base, comprising: a first portion disposed within the inner container, configured to accommodate a part of the wick and the second end of the optical fiber; and a second portion disposed outside the inner container and extending away from the inner container base, configured to accommodate at least a part of the photosensitive element of the light sensor; wherein the second end of the optical fiber and the photosensitive element are separated from each other by the defined area of the inner container base, and wherein the defined area is made of substantially transparent material, and the first portion and the second portion are substantially aligned with each other, such that the light transmitted from the optical fiber are detectable by the photosensitive element. The controller is configured to receive light signals associated with the flame lights of the wick from the light sensor, and control the at least one light-emitting device based on the light signals received.

In some embodiments, the controller is further configured to: (i) switch the at least one light-emitting device from an OFF state to an ON state if an intensity of the light signals is greater than a predetermined upper threshold; (ii) once the at least one light-emitting device is switched to the ON state, maintain the at least one light-emitting device in the ON state if the intensity of the light signals is greater than a predetermined lower threshold; (iii) if the intensity of the light signals becomes lesser than the predetermined lower threshold when the at least one light-emitting device is in the ON state, start a timer to measure a length of time in which the intensity of the light signals is lesser than the predetermined lower threshold; and if the length of time is shorter than a predetermined period of time, maintain the at least one light-emitting device in the ON state; if the length of time is longer than the predetermined period of time, switch the at least one light-emitting device from the ON state to the OFF state; and (iv) once the at least one light-emitting device is switched to the OFF state, maintain the at least one light-emitting device in the OFF state if the intensity of the light signals is lesser than the predetermined upper threshold.

In some embodiments, the lighting control component further comprises an analog-digital converting module connected to the controller, wherein the analog-digital converting module is configured to (i) analyze and process the light signals to generate digital signals, wherein the digital signals represent the intensity of the light signals, and (ii) transmit the digital signals to the controller, wherein the controller is further configured to control an illumination of the at least one light-emitting device based on the digital signals received from the analog-digital converting module when the at least one light-emitting device is in the ON state.

In some embodiments, the lighting control component further comprises a memory that stores a preset program, and the controller is further configured to control an illumination of the at least one light-emitting device based on the preset program when the at least one light-emitting device is in the ON state.

In some embodiments, the photosensitive candle further comprises a candle container hole formed on the candle container base; a casing hole formed on the casing; and a removable cover for covering the candle container hole. The candle container hole and the casing hole are substantially aligned with each other, such that the interior cavity of the casing is accessible by a user when the candle container is removed from the inner-shell and the removable cover is opened.

In some embodiments, the at least one light-emitting device comprises at least two light strings with different colors.

In the following description, same numberings are employed to illustrate the same components of different figures.

Photosensitive Candle

EXAMPLE 1

Figure 1B:
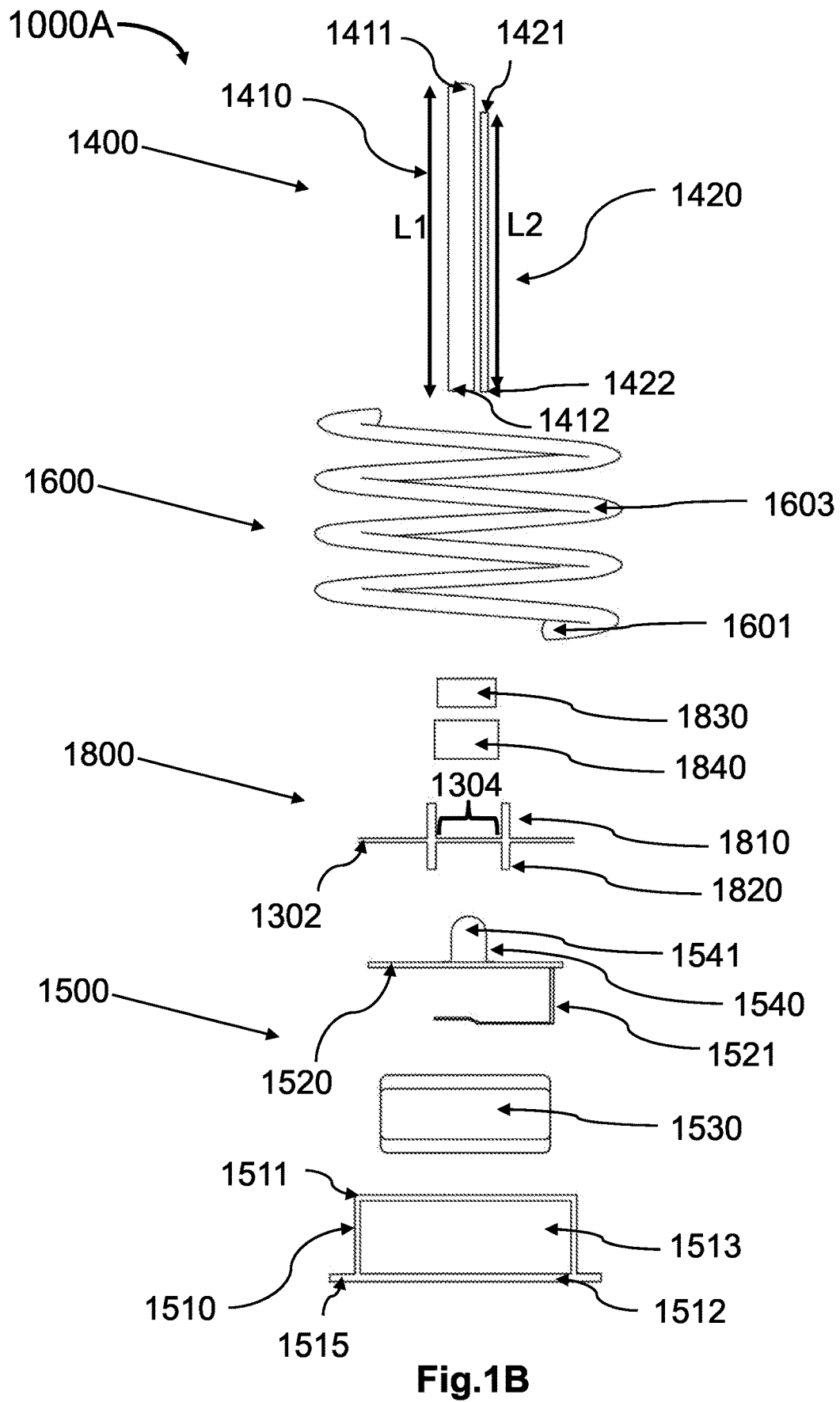
FIG. 1B is a schematic exploded view of certain parts of the photosensitive candle according to the same example embodiment as shown in FIG. 1A.

Referring now to FIGS. 1A-1B, which show an example embodiment of a photosensitive candle 1000A. FIG. 1A shows the photosensitive candle 1000A including a shell component 1100, a candle container 1200, an inner container 1300, a candle component 1400, a lighting control component 1500, a light-emitting device 1600 and a light guiding channel 1800.

In this embodiment, the shell component 1100 includes an outer-shell 1110 for accommodating the candle container 1200, and a filling 1120 disposed between the candle container 1200 and the outer-shell 1110. The outer-shell 1110 is shaped as a cup with a substantially-flat outer-shell base 1112 and an outer-shell opening 1111 opposite the outer-shell base 1112, defining a height of the outer-shell 1110 therebetween. For ease of description, the direction towards the outer-shell opening 1111 is called top and the direction towards the outer-shell base 1112 is called bottom. In some embodiments, the outer-shell 1110 can be made of a substantially transparent material or semi-transparent material to allow for a certain degree of light transmission, including but not limited to glass, crystal, plastic made of Polyethylene Terephthalate (PET), Polyvinyl Chloride (PVC), Polypropylene (PP), Polystyrene (PS), Polycarbonate (PC), Polymethyl Methacrylate (PMMA), Polyamide, ABS & SAN, Polyethylene, High Density Polyethylene (HDPE), Low Density Polyethylene (LDPE), TPU or a combination thereof In some embodiments, the outer-shell 1110 may be painted, printed or carved with various patterns on its outer surface for decorative purposes.

The outer-shell 1110 has a larger diameter than the candle container 1200 such that a space exists between the candle container 1200 and the outer-shell 1110. In some embodiments, the space is sufficiently large to accommodate at least part of the light-emitting device 1600. The filling 1120 at least partially fills in the space between the candle container 1200 and the outer-shell 1110, thereby embedding at least part of the light-emitting device 1600 therewithin. The filling 1120 has a filling surface 1123 that is arranged at a level lower than the outer-shell opening 1111. In some embodiments, the filling 1120 can be made of a substantially transparent material or semi-transparent material to allow for a certain degree of light transmission, including but not limited to gel wax, paraffin wax, crystal wax, transparent or semi-transparent polymer made of Polyethylene Terephthalate (PET), Polyethylene terephthalate-1, 4 -cyclohexane 2 methyl ester (PETG), Polyvinyl Chloride (PVC), Polyethylene (PE), Polypropylene (PP), Polystyrene (PS), Polycarbonate (PC), Polymethyl Methacrylate (PMMA), Polyamide, ABS & SAN, Polyethylene, High Density Polyethylene (HDPE), Low Density Polyethylene (LDPE), TPU, liquid silicone rubber, cyclic olefin copolymers, ionomer resin, fluorinated ethylene propylene (FEP), styrene methyl methacrylate (SMMA), epoxy or a combination thereof.

The shell component 1100 may further include a plurality of decorative pieces 1122 that is embedded and randomly dispersed within the filling 1120. In some embodiments, the decorative pieces 1122 can come in a variety of shapes and sizes. In some embodiments, the plurality of decorative pieces 1122 may include materials that can reflect and/or refract light, such as crystals, metal pieces, plastics or a combination thereof, such that a richer and more colorful visual effect can be produced when the light-emitting device illuminates. In some other embodiments, the shell component 1100 may not include any decorative material.

In this embodiment, the candle container 1200 is shaped as a cup with an interior space 1203, a substantially-flat candle container base 1202 and a candle container opening 1201 opposite the candle container base 1202, defining a height of the candle container 1200 therebetween. The candle container 1200 is disposed within the outer-shell 1110 with the candle container base 1202 placed on top of the upper surface of the outer-shell base 1112. In this embodiment, as the space between the candle container 1200 and the outer-shell 1110 is at least partially filled by the filling 1120, the candle container 1200 may be fixedly housed within the outer-shell 1110. The height of the candle container 1200 is lesser than the height of the outer-shell 1110, and the candle container opening 1201 is arranged at a level lower than the outer-shell opening 1111 but higher than the filling surface 1123.

In this embodiment, the inner container 1300, the lighting control component 1500 and the light guiding channel 1800 are disposed within interior space 1203 of the candle container 1200. The inner container 1300 is shaped as a cup with a substantially-flat inner container base 1302 and an inner container opening 1301 opposite the inner container base 1302, defining a height of the inner container 1300 therebetween. The inner container 1300 has a diameter slightly smaller than the candle container 1200 such that the inner container 1300 can be housed within the candle container 1200. The height of the inner container 1300 is lesser than the height of the candle container 1200. The inner container 1300 has a central axis (shown as dotted line 1311 in FIG. 1A) passing through the center of the inner container opening 1301 and the center of the inner container base 1302 and is substantially perpendicular to the inner container base 1302. The inner container 1300 is positioned above the lighting control component 1500 within the candle container 1200, and the inner container opening 1301 is arranged at a level that is substantially aligned with the candle container opening 1201.

In some embodiments, the candle container 1200 and the inner container 1300 can be made of heat-resistant or flame-retardant materials, including but not limited to glass, heat-resistant plastic such as Polyetherimide (PEI), Polyether ether ketone (PEEK), Polytetrafluoroethylene (PTFE), Polybenzimidazole (PBI), Polydicyclopentadiene (pDCPD), flame resistant plastics and flame retardant plastics.

Fig. 1A also shows the candle component 1400 disposed in the inner container 1300. The candle component 1400 includes a candle body 1430 filled within the inner container 1300, a wick 1410 and an optical fiber 1420 embedded in the candle body 1430. In some embodiments, the candle body 1430 is formed by pouring a molten wax into the inner container 1300, thereby embedding at least a part of the wick 1410 and the optical fiber 1420 within the candle body 1430. In this embodiment, the candle body 1430 has a top surface 1431 that is substantially aligned with the inner container opening 1301. The wick 1410 is arranged substantially perpendicular to the inner container base 1302 along the central axis 1311 and includes a bottom wick end 1412 proximate to the inner container base 1302 and an opposing top wick end 1411, defining a length L1 (shown in FIG. 1B) of the wick 1410 therebetween. The wick 1410 has an exposed portion 1413 at the top wick end 1411 protruding out of the top surface 1431 of the candle body 1430. The top wick end 1411 is arranged at a level higher than the inner container opening 1301 and the candle container opening 1201, but lower than the outer-shell opening 1111, such that when the candle is lit, the wick flame can burn stably and be protected from the disturbance of airflow around the photosensitive candle 1000A.

In this embodiment, the optical fiber 1420 is positioned juxtapose to the wick 1410 and arranged parallel to the wick 1410 for transmitting flame lights of the wick 1410. In some other embodiments, the optical fiber 1420 can be winded together with the wick 1410 and arranged substantially perpendicular to the inner container base 1302. The optical fiber 1420 includes a first end 1421 positioned proximate to the exposed portion 1413 of the wick 1410 and an opposing second end 1422 positioned proximate to the inner container base 1302, defining a length L2 (shown in FIG. 1B) of the optical fiber 1420 therebetween. In this embodiment, the length L2 of the optical fiber 1420 is shorter than the length L1 of the wick 1410. The first end 1421 is arranged at a level lower than the top wick end 1411 and the top surface 1431 of the candle body 1430, such that the optical fiber 1420 is embedded entirely in the candle body 1430. This ensures that no environmental light can get through the optical fiber 1420 when the candle is not lit, and when the candle is lit, the wick 1410 will burn first before the wick flame reaches the optical fiber 1420, thereby ensuring that the flame light of the wick 1410 is transmitted from the first end 1421 to the second end 1422 of the optical fiber 1420. In some embodiments, the optical fiber 1420 is made of plastic material or other optical fiber materials that are combustible, including but not limited to Polymethylmethacrylate (PMMA), acrylic, formulated silicon dioxide, and silica glass. In some embodiments, the optical fiber 1420 has a generally lower ignition temperature than the wick 1410.

Referring now to both FIGS. 1A and 1B, the lighting control component 1500 includes a casing 1510, a controller 1520, a power source 1530 and a light sensor 1540. In this embodiment, the casing 1510 has a generally rectangular cross-section with a substantially flat casing top side 1511 and a substantially flat casing base 1512 and includes an interior cavity 1513 within the casing 1510. In this embodiment, the casing 1510 also includes a flange 1515 extending radially away from the casing base 1512. The casing 1510 is disposed within the candle container 1200 with the casing base 1512 and the flange 1515 attached to the upper surface of the candle container base 1202. The inner container 1300 is positioned above the casing 1510 within the interior space 1203 of the candle container 1200, separated by a certain distance between the inner container base 1302 and the top side 1511 of the casing 1510. In some embodiments, a remaining space of the interior space 1203 that is not occupied by the inner container 1300 and the casing 1510 can be filled by filling material such as wax or gel, such that the relative position of the inner container 1300 within the candle container 1200 can be maintained. In some embodiments, the casing 1510 can be made of heat-resistant or flame-retardant materials.

In this embodiment, the controller 1520 and the power source 1530 are disposed within the interior cavity 1513 of the casing 1510. By way of example, the controller 1520 can be an integrated circuit, a microprocessor, a central processing unit (CPU) or a chip with embedded software. In this embodiment, the controller 1520 includes a printed circuit board with integrated electronic components mounted thereon. The controller 1520 is attached to the interior surface of the top side 1511. The power source 1530 is connected with the controller 1520 via a connector 1521 to provide power to all electronic components in the lighting control component 1500. In some embodiments, the power source 1530 can be a battery. The light sensor 1540 is connected to the controller 1520. In some embodiments, the light sensor 1540 can be mounted on the printed circuit board of the controller 1520. The light sensor 1540 includes a photosensitive element 1541 protruding outwardly from the upper surface of the casing top side 1511 towards the inner container base 1302 of the inner container 1300 that is positioned above the casing 1510. In some embodiments, the photosensitive element 1541 can be a photosensitive resistance, a photosensitive diode or a photosensitive triode.

The photosensitive element 1541 is positioned proximate to the second end 1422 of the optical fiber 1420 to detect light transmitted therefrom. As shown in FIG. 1A, the second end 1422 and the photosensitive element 1541 are separated from each other by a defined area (marked as area 1304 in FIG. 1B) of the inner container base 1302, and the second end 1422 of the optical fiber 1420 and the photosensitive element 1541 are positioned as close as possible to the defined area 1304. In this embodiment, the photosensitive candle 1000A further includes a light guiding channel 1800 attached to the defined area 1304 of the inner container base 1302. The light guiding channel 1800 includes a first portion 1810 disposed within the inner container 1300 and a second portion 1820 disposed outside the inner container 1300. The first portion 1810 is attached to the interior surface of the inner container base 1302 and configured to accommodate a part of the wick 1410 at the bottom wick end 1412 and a part of the optical fiber 1420 at the second end 1422. The second portion 1820 extends away from the inner container base 1302 towards the casing 1510 and configured to accommodate at least a part of the photosensitive element 1541 of the light sensor 1540. In this embodiment, the first portion 1810 and the second portion 1820 are substantially aligned with each other along the central axis 1311 to form the channel-shape of the light guiding channel 1800 to guide the light transmission from the second end 1422 of the optical fiber 1420 to the photosensitive element 1541. In some embodiments, the first portion 1810 and the second portion 1820 are made of non-transparent material for shielding light around the light guiding channel 1800 to prevent any undesired light from reaching the photosensitive element 1541.

In some embodiments, the defined area 1304 is made of substantially transparent material with a high degree of transparency to allow for high light transmission from the second end 1422 of the optical fiber 1420 to the photosensitive element 1541, such that the light transmitted from the optical fiber 1420 are detectable by the photosensitive element 1541. In some embodiments, the remaining area of the inner container base 1302 other than the defined area 1304 can be made of substantially transparent material, semi-transparent material or non-transparent material. The configuration of a heat-resisting/flame-retarding inner container 1300 to contain the candle component 1400 and a separate casing 1510 to house the light sensor 1540 enables the separation of the wick 1410 and the optical fiber 1420 of the candle component 1400 with the photosensitive element 1541 by the inner container base 1302, thereby preventing the wick flame and/or the molten wax of the candle component 1400 from reaching the casing 1510 and heating the electronic components housed within the casing 1510. After the wick 1410 is burned out, the wick flame of the candle component 1400 will be out and the wax of the candle body 1430 will be contained within the inner container 1300 to avoid over-heating the light control component 1500 and causing smoke or even fire hazards, thereby improving the safety when using the photosensitive candle 1000A.

Referring further to FIG. 1B, the light guiding channel 1800 may further include a non-transparent sheath 1830 enveloping a part of the wick 1410 at the bottom wick end 1412 and a part of the optical fiber 1420 at the second end 1422. In some embodiments, the non-transparent sheath 1830 can be made of non-transparent materials such as duct tape, black tape, black plastic or other non-transparent materials. The non-transparent sheath 1830 is adapted to avoid influence of environmental light and to prevent light leakage when the light is transmitted from the optical fiber 1420 to the photosensitive element 1541. Optionally, the light guiding channel 1800 may further include a supporting frame 1840 sleeved on the non-transparent sheath 1830 to provide support to the part of the wick 1410 and the optical fiber 1420. In some embodiments, the supporting frame 1840 can be fittingly inserted into the first portion 1810 of the light guiding channel 1800 so as to fix the position of the wick 1410 and the optical fiber 1420 within the first portion 1810. In some embodiments, the supporting frame 1840 can be made of metals. The existence of the non-transparent sheath 1830 and the supporting frame 1840 creates a wax-free region at the bottom wick end 1412 and the second end 1422 of the optical fiber 1420, thereby preventing the wick flame from reaching the casing 1510 and heating the electronic components housed within the casing 1510 when the wick 1410 is almost burned out, improving the safety when using the photosensitive candle 1000A.

Referring now to both FIGS. 1A and 1B, the light-emitting device 1600 in this embodiment is a light strip that is spiral in shape, including a winding main body 1603 and a connecting end 1601. The connecting end 1601 is directly or indirectly connected to the controller 1520 housed within the casing 1510. The winding main body 1603 extends out of the casing 1510 and the candle container 1200 and surrounds the exterior surface of the candle container 1200. In this embodiment, the main body 1603 is at least partially embedded in the filling 1120. In some embodiments, the controller 1520 may have a pin (not shown) protruding away from the controller 1520 for removable electrical connection with the connecting end 1601 of the light-emitting device 1600. In some other embodiments, the connecting end 1601 of the light-emitting device 1600 may be welded onto the printed circuit board of the controller 1520 for an irremovable electrical connection. In some embodiments, the light-emitting device 1600 may be removably or irremovably connected with the controller by any other means of electrical connection.

The connection between the controller 1520, the light sensor 1540 and the light-emitting device 1600 allows the controller 1520 to receive light signals associated with the flame lights of the wick 1410 from the light sensor 1540, and control the illumination of the light-emitting device 1600 based on the received light signals. The operation of the controller 1520 will be described in more detail later.

EXAMPLE 2

Figure 2:
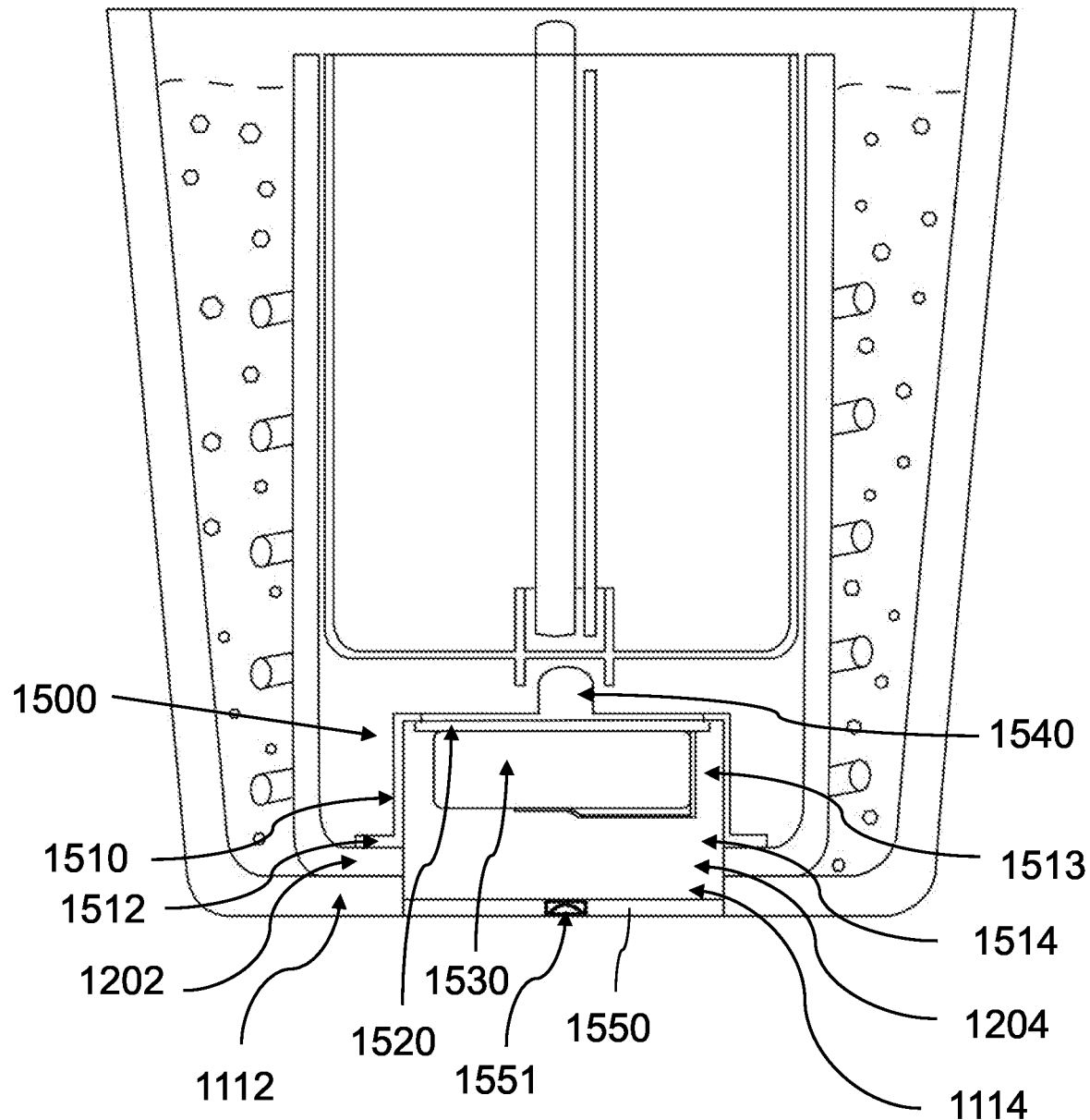
FIG. 2 is a schematic cross-sectional view of a photosensitive candle according to another example embodiment.

Referring now to FIG. 2, it shows a photosensitive candle 1000B according to another example embodiment. The photosensitive candle 1000B has a largely similar structure to the photosensitive candle 1000A as described in Example 1. In this embodiment, the photosensitive candle 1000B further comprises an outer-shell hole 1114 formed on the outer-shell base 1112, a candle container hole 1204 formed on the candle container base 1202, and a casing hole 1514 formed on the casing base 1512 of the casing 1510. A removable cover 1550 is provided for covering the outer-shell hole 1114. In this embodiment, a button 1551 is disposed on the removable cover 1550 such that the removable cover 1550 can be opened and removed from the outer-shell hole 1114 when the button 1551 is pressed. In this embodiment, the outer-shell hole 1114, the candle container hole 1204 and the casing hole 1514 are substantially aligned with each other and have a largely similar diameter. The diameters of the outer-shell hole 1114, the candle container hole 1204 and the casing hole 1514 are sufficiently large such that the interior cavity 1513 of the casing 1510 is accessible by a user when the removable cover 1550 is opened. This allows for a replacement of the power source 1530 (e.g. battery) of the light control component 1500 when it is used up without the need to dispose the entire photosensitive candle 1000B, making it more environmental friendly to use. In some embodiments, the user may also replace the controller 1520 and/or the light sensor 1540 whenever necessary.

It should be understood that although Example 2 has a largely similar structure to the photosensitive candle 1000A as described in Example 1, the additional features as described in Example 2 above are not limited to being applied to the photosensitive candle of Example 1. Similar features can also be applied to any other examples of the photosensitive candle, including but not limited to the photosensitive candles that will be described in Examples 4-5 later.

EXAMPLE 3

Figure 3:
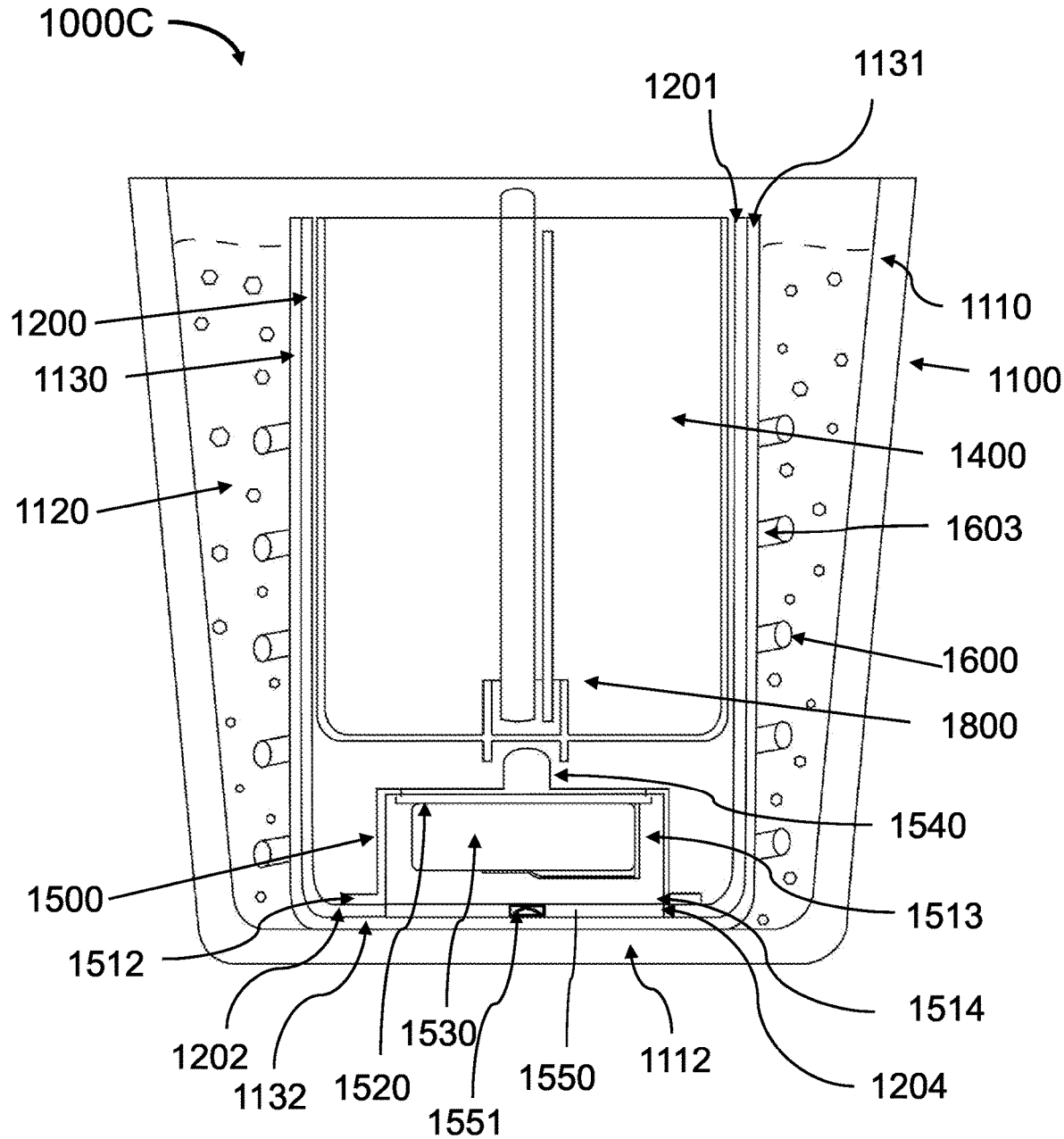
FIG. 3 is a schematic cross-sectional view of a photosensitive candle according to another example embodiment.

Referring now to FIG. 3, it shows a photosensitive candle 1000C according to another example embodiment. The photosensitive candle 1000C has a largely similar structure to the photosensitive candle 1000A as described in Example 1. In this embodiment, the shell component 1100 of the photosensitive candle 1000C further includes an inner-shell 1130 comprising an inner-shell base 1132 and an opposing inner-shell opening 1131. The inner-shell 1130 is housed within the outer-shell 1110 with the inner-shell base 1132 disposed on top of the outer-shell base 1112. The inner-shell 1130 has a diameter smaller than the outer-shell 1110 but slightly larger than the candle container 1200 such that the candle container 1200 can be accommodated within the inner-shell 1130 with the candle container base 1202 disposed on top of the inner-shell base 1132. In some embodiments, the inner-shell opening 1131 is arranged at a level that is substantially aligned with the candle container opening 1201. In this embodiment, the filling 1120 at least partially fills in the space between the inner-shell 1130 and the outer-shell 1110, thereby fixing the position of the inner-shell 1130 within the outer-shell 1110. In some embodiments, the main body 1603 of the light-emitting device 1600 extends out of the casing 1510, the candle container 1200 and the inner-shell 1130 and is at least partially embedded in the filling 1120.

In some embodiments, the candle container 1200 has a shape that is complementary to the shape of the inner-shell 1130 such that it can be fittingly inserted into the inner-shell 1130. In some embodiments, the candle container 1200 is configured to be removably accommodated within the inner-shell 1130, and the connecting end (not shown in FIG. 3) of the light-emitting device 1600 is removably connected with the controller 1520. As such, the candle container 1200 can be removed after the candle component 1400 is used up and replaced with a new candle container, while the shell component 1100 is reusable for a long period of time, thereby offering a cost-effective and environmental friendlier solution for using the photosensitive candle 1000C. In some embodiments, a user may choose a candle container 1200 among a variety of candle containers with different designs (e.g. color of the wax, preset programs stored in the controller etc.) and insert it into a shell component 1100 chosen from a variety of shell components with different designs (e.g. shapes of the outer-shell 1110, color of the filling and decorative pieces, types and numbers of light-emitting devices etc.), thereby offering a wide variety of combinations of the candle container 1200 and the shell component 1100 according to the user's preference to create photosensitive candles with different visual effects.

In this embodiment, the photosensitive candle 1000C further comprises a candle container hole 1204 formed on the candle container base 1202 and a casing hole 1514 formed on the casing base 1512 of the casing 1510. A removable cover 1550 is provided for covering the candle container hole 1204. In this embodiment, a button 1551 is disposed on the removable cover 1550 such that the removable cover 1550 can be opened and removed from the candle container hole 1204 when the button 1551 is pressed. In this embodiment, the candle container hole 1204 and the casing hole 1514 are substantially aligned with each other and have a largely similar diameter. The diameters of the candle container hole 1204 and the casing hole 1514 are sufficiently large such that the interior cavity 1513 of the casing 1510 is accessible by a user when the candle container 1200 is removed from the inner-shell 1130 and the removable cover 1550 is opened. This allows for a replacement of the power source 1530 (e.g. battery) of the light control component 1500 when it is used up without the need to dispose the candle container 1200, making it more environmental friendly to use. In some embodiments, the user may also replace the controller 1520 and/or the light sensor 1540 whenever necessary.

It should be understood that although Example 3 has a largely similar structure to the photosensitive candle 1000A as described in Example 1, the additional features as described in Example 3 above are not limited to being applied to the photosensitive candle of Example 1. Similar features can also be applied to any other examples of the photosensitive candle, including but not limited to the photosensitive candles that will be described in Examples 4-5 later.

EXAMPLE 4

Figure 4A:
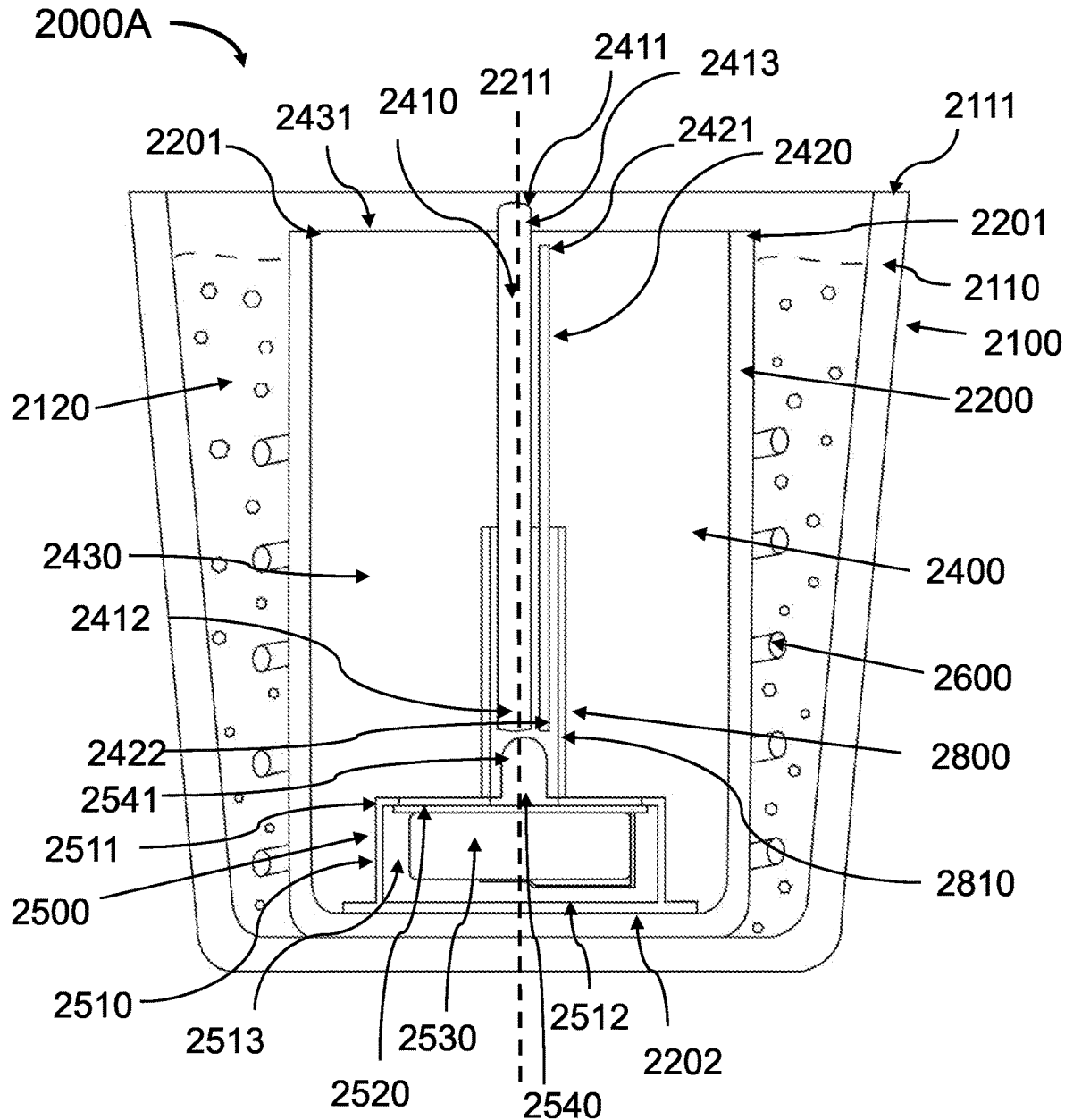
FIG. 4A is a schematic cross-sectional view of a photosensitive candle according to another example embodiment.
Figure 4B:
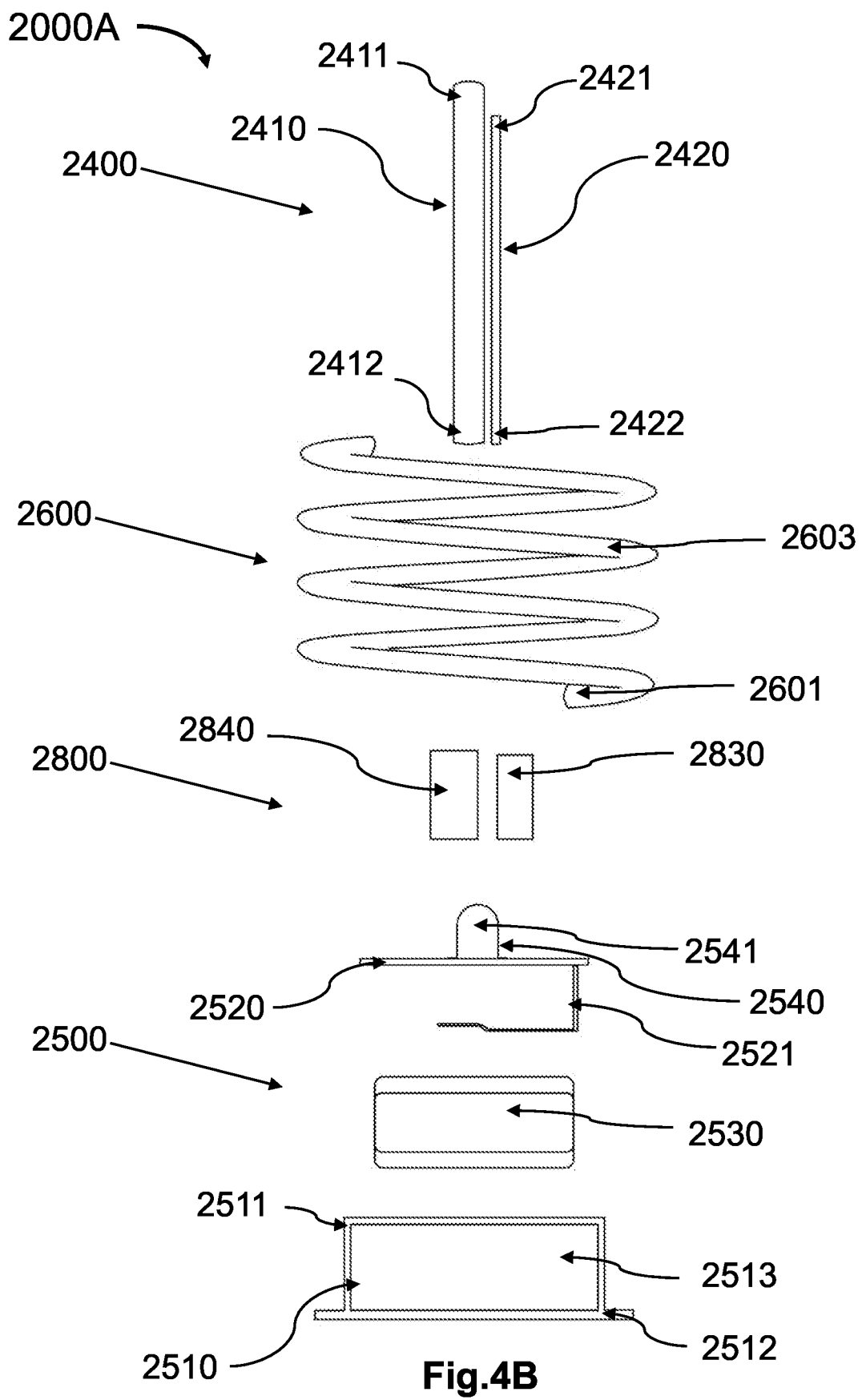
FIG. 4B is a schematic exploded view of certain parts of the photosensitive candle according to the same example embodiment as shown in FIG. 4A.

Referring now to FIGS. 4A and 4B, a photosensitive candle 2000A is shown according to another example embodiment. The photosensitive candle 2000A includes a shell component 2100, a candle container 2200, a candle component 2400, a lighting control component 2500, a light-emitting device 2600 and a light guiding channel 2800. In this embodiment, the photosensitive candle 2000A does not include an inner container as described earlier in Examples 1-3 above.

In this embodiment, the shell component 2100 includes an outer-shell 2110 for accommodating the candle container 2200, and a filling 2120 disposed between the candle container 2200 and the outer-shell 2110. The structures and the arrangements of the outer-shell, the candle container and the filling are generally similar to those as described in Example 1. As the space between the candle container 2200 and the outer-shell 2110 is at least partially filled by the filling 2120, the candle container 2200 may be fixedly housed within the outer-shell 2110. The candle container 2200 includes a substantially-flat candle container base 2202 and a candle container opening 2201 opposite the candle container base 2202, and has a central axis (shown as dotted line 2211 in FIG. 4A) passing through the center of the candle container opening 2201 and the center of the inner container base 2202 and is substantially perpendicular to the candle container base 2202.

In this embodiment, the candle component 2400 and the lighting control component 2500 are both disposed in the candle container 2200. The candle component 2400 includes a candle body 2430 filled within the inner container 2300, a wick 2410 and an optical fiber 2420 embedded in the candle body 2300. In some embodiments, the candle body 2430 is formed by pouring a molten wax into the candle container 2300, thereby embedding at least a part of the wick 2410, the optical fiber 2420 and the lighting control component 2500 within the candle body 2430. In this embodiment, the candle body 2430 has a top surface 2431 that is substantially aligned with the candle container opening 2201. The wick 2410 is arranged substantially perpendicular to the candle container base 2202 along the central axis 2211 and includes a bottom wick end 2412 and an opposing top wick end 2411. The wick 2410 has an exposed portion 2413 at the top wick end 2411 protruding out of the top surface 2431 of the candle body 2430. The top wick end 2411 is arranged at a level higher than the candle container opening 2201, but lower than the outer-shell opening 2111, such that when the candle is lit, the wick flame can burn stably and be protected from the disturbance of airflow around the photosensitive candle 2000A.

In this embodiment, the optical fiber 2420 is positioned juxtapose to the wick 2410 and arranged parallel to the wick 2410 for transmitting flame lights of the wick 2410. The optical fiber 2420 includes a first end 2421 positioned proximate to the exposed portion 2413 of the wick 2410 and an opposing second end 2422. The first end 2421 is arranged at a level lower than the top wick end 2411 and the top surface 2431 of the candle body 2430, such that the optical fiber 2420 is embedded entirely in the candle body 2430.

The lighting control component 2500 includes a casing 2510, a controller 2520, a power source 2530 and a light sensor 2540. The casing 2510 has a casing top side 2511 and a casing base 2512 and includes an interior cavity 2513 within the casing 2510. The structures and the arrangements of the casing, the controller and the power source disposed within the interior cavity of the casing, and the light sensor are generally similar to those as described in Example 1. The light sensor 2540 includes a photosensitive element 2541 protruding outwardly from the upper surface of the casing top side 2511. In this embodiment, the photosensitive element 2541 is positioned proximate to the second end 2422 of the optical fiber 2420 to detect light transmitted therefrom. As shown in FIG. 4A, the second end 2422 of the optical fiber 2420 and the photosensitive element 2541 are substantially aligned with each other along the central axis 2211 and are positioned as close as possible to each other to allow for a higher degree of light transmission from the optical fiber 2420 to the photosensitive element 2541. In some other embodiments, the second end 2422 of the optical fiber 2420 touches the photosensitive element 2541 such that loss of light intensity during light transmission can be minimized.

In this embodiment, the photosensitive candle 2000A further includes a light guiding channel 2800 disposed within the candle container 2200 and embedded in the candle body 2430. The light guiding channel 2800 includes a channel body 2810 configured to accommodate a part of the wick 2410 at the bottom wick end 2412, a part of the optical fiber 2420 at the second end 2422, and at least a part of the photosensitive element 2541 of the light sensor 2540 to guide the light transmission from the second end 2412 of the optical fiber 2420 to the photosensitive element 2541 within the channel body 2810. In some embodiments, the channel body 2810 are made of non-transparent material for shielding light around the light guiding channel 2800 to avoid any undesired light from reaching the photosensitive element 2541.

Referring now to FIG. 4B, the light guiding channel 2800 may further include a non-transparent sheath 2830 enveloping a part of the optical fiber 2420 at the second end 2422 and at least a part of the photosensitive element 2541. The non-transparent sheath 2830 is adapted to avoid influence of environmental light and to prevent light leakage when the light is transmitted from the optical fiber 2420 to the photosensitive element 2541. Optionally, the light guiding channel 2800 may further include a supporting frame 2840 sleeved on the non-transparent sheath 2830 to provide support to the part of the wick 2410 and the optical fiber 2420. In some embodiments, the supporting frame 2840 can be fittingly inserted into the channel body 2810 (shown in FIG. 4A) so as to fix the position of the wick 2410 and the optical fiber 2420 within the channel body 2810, so that their position will not be altered when the wax is filled in the candle container 2200 to form the candle body 2430. In some embodiments, the existence of the channel body 2810, the non-transparent sheath 2830 and/or the supporting frame 2840 creates a wax-free region at the bottom wick end 2412 and the second end 2422 of the optical fiber 2420, thereby preventing the wick flame from reaching the casing 2510 and heating the electronic components housed within the casing 2510 when the wick 2412 is almost burned out, improving the safety when using the photosensitive candle 2000A.

Referring now to both FIGS. 4A and 4B, the light-emitting device 2600 in this embodiment is a light strip that is spiral in shape, including a winding main body 2603 and a connecting end 2601. The connecting end 2601 is directly or indirectly connected to the controller 2520 housed within the casing 2510. The winding main body 2603 extends out of the casing 2510 and the candle container 2200 and surrounds the exterior surface of the candle container 2200. In this embodiment, the main body 2603 is at least partially embedded in the filling 2120.

EXAMPLE 5

Figure 5:
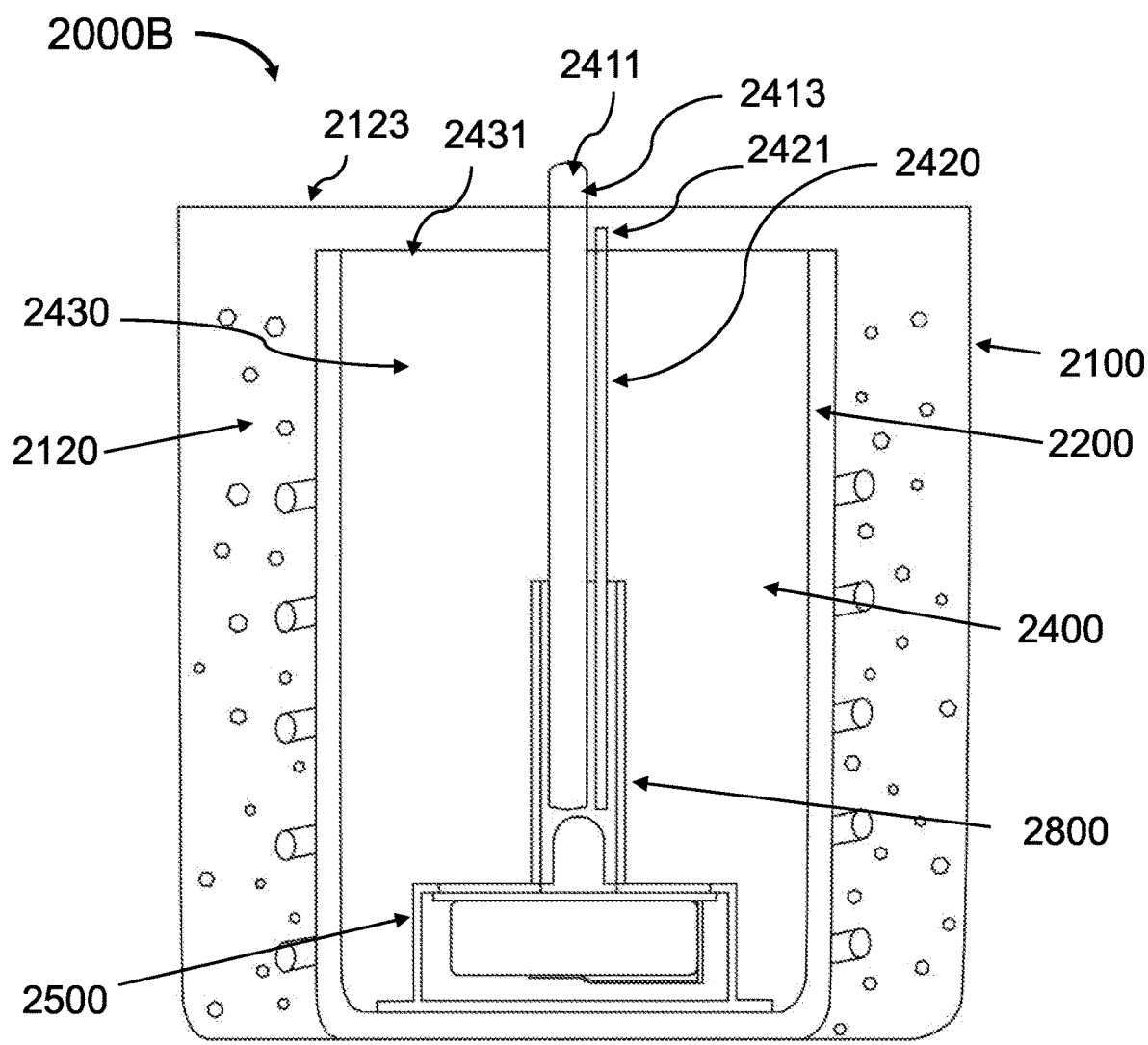
FIG. 5 is a schematic cross-sectional view of a photosensitive candle according to another example embodiment.

Referring now to FIG. 5, which shows a photosensitive candle 2000B according to another example embodiment. The photosensitive candle 2000B has a largely similar structure to the photosensitive candle 2000A as described in Example 4. In this embodiment, the shell component 2100 only consists of the filling 2120 without any additional outer-shell to accommodate the filling 2120. In some embodiments, the filling 2100 is formed by: (1) placing the candle container 2200 housing the candle component 2400, the light controlling component 2500 and the light guiding channel 2800 into a mold; (2) pouring a molten wax or gel into the mold, thereby embedding the candle container 2200 and all the components housed therein within the filling 2120. In this embodiment, the filling 2120 has a top filling surface 2123 that is arranged at a level higher than the top surface 2431 of the candle body 2430. The wick 2410 has an exposed portion 2413 at the top wick end 2411 protruding out of the top filling surface 2123 to allow the wick flame to be lit. The first end 2421 of the optical fiber 2420 is positioned proximate to the exposed portion 2413 and arranged at a level lower than the top filling surface 2123 but higher than the top surface 2431 of the candle body 2430.

It should be understood that although Example 5 has a largely similar structure to the photosensitive candle 2000A as described in Example 4, the feature of the shell component 2100 having only the filling 2120 as described in Example 5 is not limited to being able to replace the corresponding feature of the photosensitive candle of Example 4. It can also be applied to any other examples of the photosensitive candle, including but not limited to the photosensitive candles as described in Examples 1-3 above.

How The Photosensitive Candle works

Now turning to the operation of the photosensitive candle as described above by referring to FIG. 1A as an example.

When the candle component 1400 is lit by igniting the exposed portion 1413 of the wick 1410 to produce a wick flame, the top surface 1431 of the candle body 1430 made of wax will subsequently melt such that the first end 1421 of the optical fiber 1420 is exposed. As the wick 1410 and the optical fiber 1420 is positioned juxtapose to each other, the flame light of the wick 1410 is transmitted from the first end 1420 to the second end 1422 of the optical fiber 1420, passes through the defined area (labelled as area 1304 in FIG. 1B) of the inner container base 1302 which is transparent, and subsequently detected by the photosensitive element 1541 positioned proximate to the second end 1422 of the optical fiber 1420. The light sensor 1540 generates light signals associated with the flame light of the wick 1410 in response to the light detected by the photosensitive element 1541. The controller 1520 receives the light signals from the light sensor 1540 and sends driving signals to the light-emitting device 1600 to control the light-emitting device 1600 based on the received light signals. In some embodiments, the controller 1520 is configured to switch the light-emitting device 1600 from an OFF state to an ON state if the intensity of the light signals is greater than a predetermined threshold.

In some embodiments, the optical fiber 1420 burns together with the wick 1410 when the candle component 1400 is lit. Following the consumption of the wax in the candle body 1430 during the burning process, the lengths of the wick 1410 and the optical fiber 1420 are continuously reduced. As the optical fiber 1420 has a generally lower ignition temperature than the wick 1410, the top end of the optical fiber 1420 is always lower than the top end of the wick 1410 and the wick flame during the burning process, so as to ensure that the flame light of the wick 1410 can always be received by the photosensitive element 1541 to maintain a controlling operation by the controller 1520 on the light-emitting device 1600. If the wick flame is extinguished, no light is detected by the photosensitive element 1541. As such, the controller 1520 will not receive any light signals from the light sensor 1540 and may switch off the light-emitting device 1600. If the wick 1410 is ignited again, the flame light of the wick 1410 will again be received by the photosensitive element 1541, and the controller 1520 will be triggered by the light signals received to switch the light-emitting device 1600 from an OFF state to an ON state if the intensity of the light signals is greater than the predetermined threshold.

Operation Of The controller

The operation of the controller of the photosensitive candle as described in any of the examples above (including but not limited to Examples 1-5) will now be described in detail. The controller may be programmed to operate based on any one of the examples below or any combinations between the examples below.

EXAMPLE 6

Figure 6:
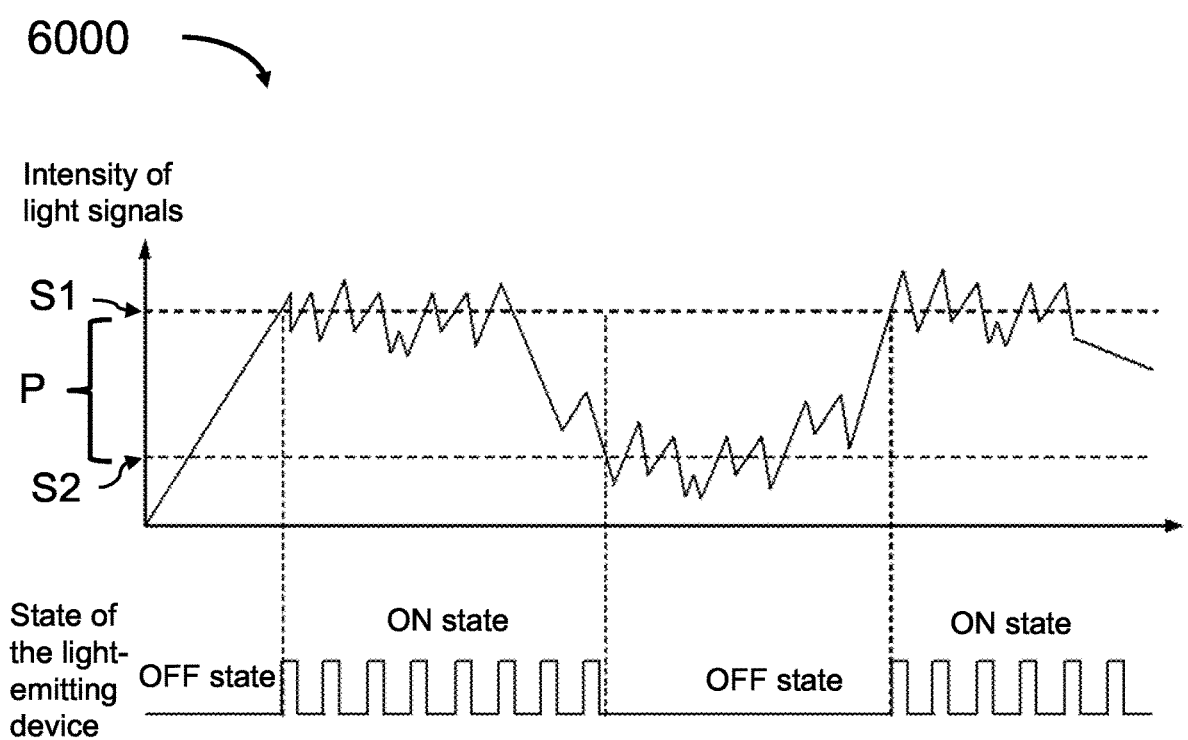
FIG. 6 is a schematic graph showing the ON-OFF state switching of the light-emitting device triggered by the changes in the intensity of the light signals, according to an example embodiment.

Referring now to FIG. 6, it shows an example embodiment on how the controller controls the switching of the light-emitting device between an ON state and an OFF state. Before the candle is lit, no light is detected by the light sensor and the light-emitting device is kept in the OFF state in which it does not light up. When the candle is lit to produce a wick flame, the light sensor generates light signals associated with the flame light of the wick in response to the light detected by the photosensitive element. Therefore, the intensity of the light signals reflects the brightness of the flame light of the wick. The controller is configured to receive the light signals associated with the flame light of the wick from the light sensor to control the light-emitting device based on intensity of the light signals.

Referring to schematic graph 6000 of FIG. 6, the controller compares the intensity of light signals with a predetermined upper threshold Si and a predetermined lower threshold S2. For ease of description, the interval between the predetermined upper threshold Si and the predetermined lower threshold S2 is referred to as interval P. When the candle component is lit but the intensity of the light signals does not reach the predetermined upper threshold S1, the light-emitting device is not triggered on and still kept in the OFF state. If the intensity of the light signals is greater than the predetermined upper threshold S1, the controller switches the light-emitting device from the OFF state to the ON state, in which the light-emitting device lights up. Once the light-emitting device is switched to the ON state, the controller maintains the light-emitting device in the ON state, as long as the intensity of the light signals is greater than the predetermined lower threshold S2. In other words, once the light-emitting device is switched to the ON state, the light-emitting device will be kept in the ON state if the intensity of light signals falls within the interval P or greater than the predetermined upper threshold S1.

In some embodiments, if the intensity of the light signals drops to a value lesser than the predetermined lower threshold S2, the controller is configured to switch the light-emitting device from the ON state to the OFF state. Once the light-emitting device is switched to the OFF state, the controller maintains the light-emitting device in the OFF state, as long as the intensity of the light signals is lesser than the predetermined upper threshold S1. In other words, once the light-emitting device is switched to the OFF state, the light-emitting device will be kept in the OFF state if the intensity of light signals falls within the interval P or lesser than the predetermined upper threshold S1. If the intensity of the light signals rises again to a value greater than the predetermined upper threshold S1, the controller will again switch the light-emitting device from the OFF state to the ON state as described above.

The configuration of the predetermined upper threshold S1, the predetermined lower threshold S2 and the interval P as described above ensures that the illumination of the light-emitting device can be maintained at a stable manner compared to configuration with only one threshold value that determines the switching on/off of the light-emitting device. When the candle component is lit, a higher intensity of light is required to switch on the light-emitting device, whereas when the candle component is burning normally, the light-emitting device will be switched off only when the intensity of light reduces to a lower value, thereby avoiding the constant switching of the light-emitting device from the ON state to the OFF state and maintaining the stability of the illumination of the light-emitting device during use.

EXAMPLE 7

Figure 7A:
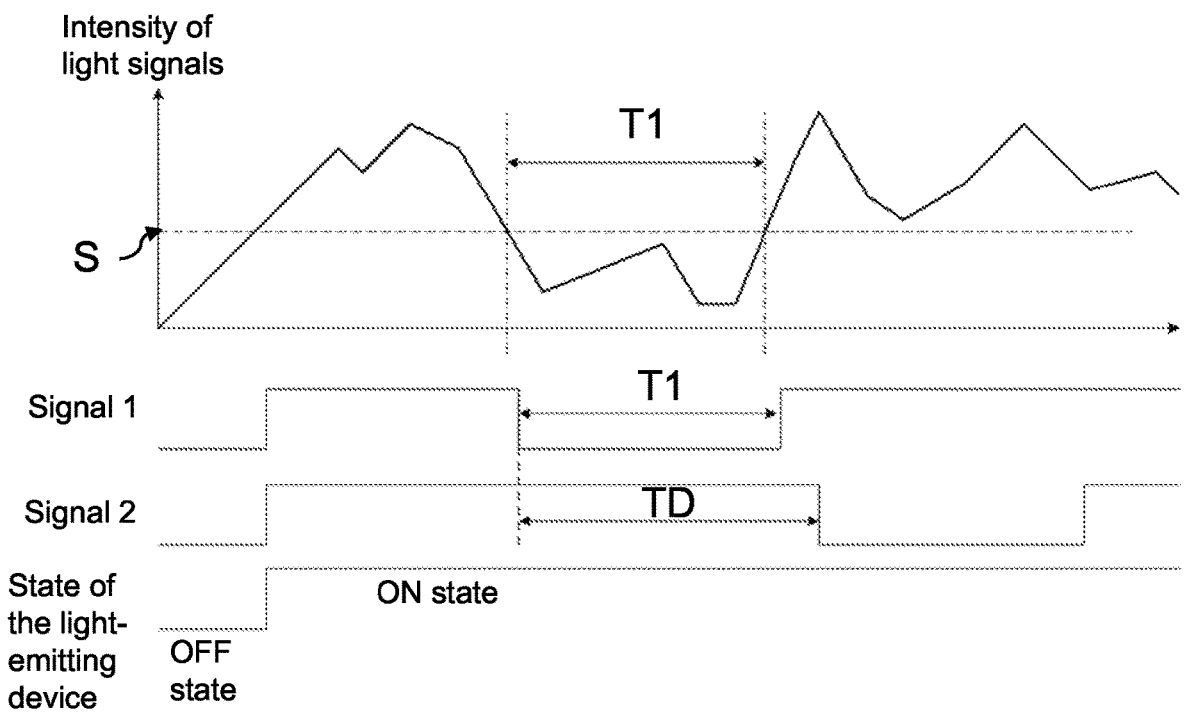
FIG. 7A is a schematic graph showing the control of delayed shut-off mechanism of the light-emitting device according to an example embodiment.
Figure 7B:
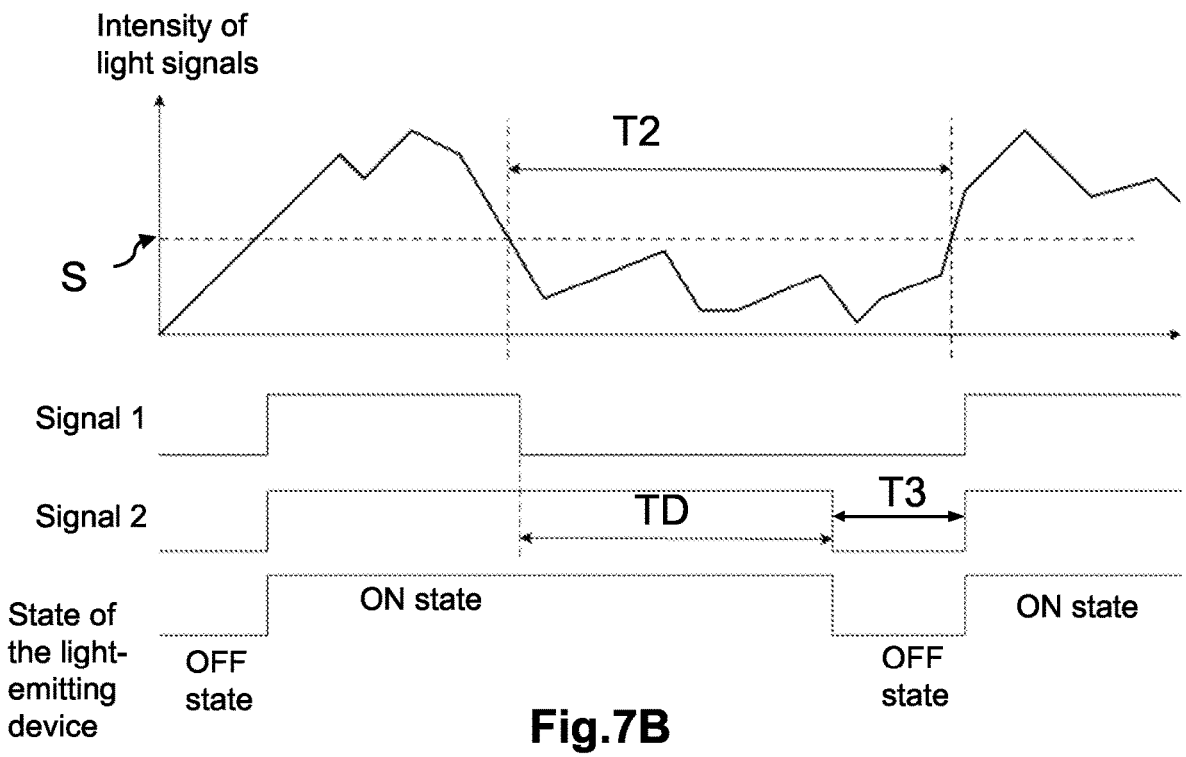
FIG. 7B is a schematic graph showing the control of delayed shut-off mechanism of the light-emitting device according to another example embodiment.

Referring now to FIGS. 7A and 7B, operations of a delayed switching off function by the controller are shown in accordance to example embodiments. In some embodiments, the delayed switching off function can be applied to the configuration as described in Example 6 if the intensity of the light signals drops to a value lesser than the predetermined lower threshold S2. In some other embodiments, the delayed switching off function can be an independent function that is executed by the controller.

The configuration of the delayed switching off function is described in detail in two different scenarios as demonstrated in FIGS. 7A and 7B respectively. Referring now to graph 7000A of FIG. 7A, the controller compares the intensity of light signals with a predetermined threshold S. In some embodiments, the predetermined threshold S can be the predetermined lower threshold S2 as described in Example 6 above. In one embodiment, if the intensity of the light signals is greater than the predetermined threshold S, the controller generates two signals (referred as signal 1 and a signal 2) and control the ON-OFF state of the light-emitting device based on the two signals. Signal 1 is an indication of the real-time intensity of light signals comparing with the predetermined threshold S, where any intensity of light signals above the predetermined threshold S actives signal 1 and any intensity of light signals below the predetermined threshold S deactives signal 1. Signal 2 is an indication with delay of the intensity of light signals comparing with the predetermined threshold S. In some other embodiments, the controller generates the signals to switch the light-emitting device from the OFF state to the ON state only when the intensity of light signals is greater than a predetermined upper threshold, as described in Example 6 above.

In this embodiment, if the intensity of the light signals drops to a value lesser than the predetermined threshold S, signal 1 will be deactivated instantly while signal 2 remains active for a predetermined period of time TD. The light-emitting device will be maintained in the ON state as long as at least one of the signal 1 and signal 2 remains active. As shown in FIG. 7A, if the length of time T1 is shorter than the predetermined period of time TD, signal 2 will remain active at least throughout the period of time TD, thereby maintaining the light-emitting device in the ON state. When the intensity of the light signals rises again to a value greater than the predetermined threshold S, signal 1 will be activated again instantly, and therefore the light-emitting device will be kept in the ON state.

In another scenario as shown in graph 7000B of FIG. 7B, the intensity of the light signals maintains below the predetermined threshold S for a length of time T2. As described above, when the intensity of the light signals drops to a value lesser than the predetermined threshold S, signal 1 will be deactivated instantly while signal 2 remains active for a predetermined period of time TD. If the length of time T2 is longer than the predetermined period of time TD as shown in FIG. 7B, signal 2 will be deactivated after remaining active for the predetermined period of time TD. As a result, both signal 1 and signal 2 is not active during the period (labelled as T3 in FIG. 7B) in which T2 surpasses the predetermined period of time TD, thereby triggering the switching of the light-emitting device from the ON state to the OFF state. In one embodiment, if the intensity of the light signals rises again to a value greater than the predetermined threshold S, the controller activates signal 1 and signal 2 again to switch the light-emitting device from the OFF state to the ON state.

As another implementation, the controller is configured to start a timer once the intensity of the light signals drops to a value lesser than the predetermined threshold S and end the timer once the intensity of the light signals increases to a value greater than the predetermined threshold S, to measure a length of time in which the intensity of the light signals is lesser than the predetermined threshold S. In the example shown in FIG. 7A, the controller may measure the time of T1 and if T1 is less than TD, it controls the the light-emitting device to maintain in the ON state. In the scenario as shown in FIG. 7B, the controller may measure the time of T2 and once T2 surpasses TD, it controls the light-emitting device to switch from the ON state to the OFF state. In this way, the delayed switching off function of the light-emitting device is enabled to avoid temporary disturbance on the candle from the environment.

The specific predetermined period of time TD can be set according to the preference of the user. In some embodiments, the predetermined period of time TD is set at a value between 1 second to 6 seconds. In some embodiments, the predetermined period of time TD is set at a value between 2 seconds to 5 seconds. In a specific embodiment, the predetermined period of time TD is set as 4 seconds.

The configuration of the delayed switching off function as described above ensures that the light-emitting device will be switched from an ON state to an OFF state only if the intensity of the light signals is lesser than the predetermined lower threshold for a predetermined period of time, thereby avoiding undesirable switching off of the light-emitting device when the flame light of the wick are temporarily diminished (but not extinguished) by a disturbance of airflow around the photosensitive candle. As such, the light-emitting device can illuminate stably and continuously.

EXAMPLE 8

In some embodiments, the light control component may comprise one or more additional electrical components connected to the controller such that when the light-emitting device is in the ON state, the controller can be configured to control an illumination of the light-emitting device based on one or more different light modes. Some examples of these light modes are described in detail below.

Light Mode 1: Synchronous Mode

In some embodiments, the lighting control component further comprises an analog-digital converting module connected to the controller. The analog-digital converting module is configured to (i) analyze and process the light signals to generate digital signals, wherein the digital signals represent the intensity of the light signals, and (ii) transmit the digital signals to the controller. The controller is configured to control an illumination of the light-emitting device based on the digital signals received from the analog-digital converting module when the light-emitting device is in the ON state.

By way of example, when the controller receives the light signals associated with the flame lights of the wick from the light sensor, the controller passes the light signals to the analog-digital converting module. The analog-digital converting module performs analog/digital conversion of the light signals received by analyzing and processing the light signals to generate digital signals. The digital signals represent the intensity of the light signals. As such, when the flame lights of the wick flicker, a change in the intensity of the light signals will alter the digital signals generated. The digital signals will then be transmitted back to the controller, in which the controller controls an illumination of the light-emitting device based on the digital signals received. As a result, in some embodiments, the luminescence (e.g. brightness, light output, color temperature, etc.) and/or light pattern (e.g. change of color, frequency of flashing the light, etc.) of the light-emitting device will vary with the change in the intensity of the light signals received, thereby synchronizing the illumination of the light-emitting device with the flickering of the flame lights of the wick.

Light Mode 2: Independent Illumination Mode

In some embodiments, the controller comprises a memory (such as random access memory (RAM), read only memory (ROM), and/or firmware) that stores a preset program, and the controller is configured to control an illumination of the light-emitting device based on the preset program when the light-emitting device is in the ON state. In some embodiments, the preset program may direct the controller to generate driving signals in accordance with pulse-width modulation (PWM) signals modulated by specific codes to drive the illumination of the light-emitting device. The preset program may determine the brightness of the light-emitting device, the change of color, the frequency of flashing the light and/or other light patterns. After the candle component is lit to switch the light-emitting device to the ON state, the light-emitting device illuminates according to the preset program that is independent from the intensity of the light signals received. When the wick flame is extinguished, the light-emitting device switches off and the illumination of the light-emitting device stops automatically.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the outer-shell, the inner-shell, the candle container, the inner-container in example embodiments above are described as having a cup-shape, but other shapes and designs may be used according to the user's preference, as long as an opening is provided in these shapes to ensure that the wick flame can be lit and maintained within the photosensitive candle.

For example, the photosensitive candle in the embodiments above includes a light-emitting device (e.g. light strip) that are connected to the controller. In some other embodiments, the photosensitive candle may include two or more light-emitting devices that are removably or irremovably connected with the controller. In some embodiments, the two or more light-emitting devices may comprises LED with different colors.

For example, the light-emitting device 1600 in Example 1 is a light strip that is spiral in shape, including a winding main body 1603 extending out of the casing 1510 and the candle container 1200 and surrounding the exterior surface of the candle container 1200. In some other embodiments, the light-emitting device can be any device in any shapes, including but not limited to a light emitting diode (LED), a light bulb, a light ring, a light block, a light string and a light tube, as long as it is configured to emit light or having a light-emitting element or the like.

What is claimed is:

1. A photosensitive candle comprising:
   (a) a candle container comprising an opening;
   (b) a candle component disposed in the candle container, comprising:
      a candle body having a surface proximate to or substantially aligned with the opening;
      a wick with an exposed portion protruding out of the surface of the candle body; and
      an optical fiber embedded in the candle body and positioned juxtapose to the wick for transmitting flame lights of the wick, wherein the optical fiber comprises a first end proximate to the exposed portion of the wick and an opposing second end;

(c) a lighting control component disposed in the candle container, comprising:
  a casing comprising an interior cavity;
  a controller and a power source disposed within the interior cavity; and
  a light sensor connected to the controller, comprising a photosensitive element proximate to the second end of the optical fiber to detect light transmitted therefrom; and (d) at least one light-emitting device connected to the controller;

wherein the controller is configured to:
  (i) receive light signals associated with the flame lights of the wick from the light sensor;
  (ii) switch the at least one light-emitting device from an OFF state to an ON state if an intensity of the light signals is greater than a predetermined upper threshold;
  (iii) maintain the at least one light-emitting device in the ON state if the at least one light-emitting device is in the ON state and the intensity of the light signals is greater than a predetermined lower threshold;
  (iv) switch the at least one light-emitting device from the ON state to the OFF state if the intensity of the light signals is lesser than the predetermined lower threshold for a predetermined period of time; and
  (v) maintain the at least one light-emitting device in the OFF state if the at least one light-emitting device is in the OFF state and the intensity of the light signals is lesser than the predetermined upper threshold.

2. The photosensitive candle of claim 1, wherein the lighting control component further comprises an analog-digital converting module connected to the controller, wherein the analog-digital converting module is configured to:
  (i) analyze and process the light signals to generate digital signals, wherein the digital signals represent the intensity of the light signals; and
  (ii) transmit the digital signals to the controller,
wherein the controller is further configured to control an illumination of the at least one light-emitting device based on the digital signals received from the analog-digital converting module when the at least one light-emitting device is in the ON state.

3. The photosensitive candle of claim 1, wherein the lighting control component further comprises a memory that stores a preset program, and the controller is further configured to control an illumination of the at least one light-emitting device based on the preset program when the at least one light-emitting device is in the ON state.

4. The photosensitive candle of claim 1, wherein the predetermined period of time is between 1 second to 6 seconds.

5. The photosensitive candle of claim 1, wherein the candle container further comprises a candle container base opposite the opening, and the photosensitive candle further comprises a shell component including:
  an outer-shell comprising an outer-shell base, wherein the outer-shell is configured to accommodate the candle container with the candle container base disposed on top of the outer-shell base; and
  a filling that fills in a space between the candle container and the outer-shell,
  wherein the at least one light-emitting device comprises a main body extending out of the casing and the candle container and is at least partially embedded in the filling.

6. The photosensitive candle of claim 5, further comprising
  an outer-shell hole formed on the outer-shell base;
  a candle container hole formed on the candle container base;
  a casing hole formed on the casing; and
  a removable cover for covering the outer-shell hole;
  wherein the outer-shell hole, the candle container hole and the casing hole are substantially aligned with each other such that the interior cavity of the casing is accessible by a user when the removable cover is opened.

7. The photosensitive candle of claim 1, wherein the candle container further comprises a candle container base opposite the opening, and the photosensitive candle further comprises a shell component including:
  an outer-shell comprising an outer-shell base;
  an inner-shell comprising an inner-shell base, wherein the inner-shell is housed within the outer-shell with the inner-shell base disposed on top of the outer-shell base, and the inner-shell is configured to removably accommodate the candle container with the candle container base disposed on top of the inner-shell base; and
  a filling that fills in a space between the inner-shell and the outer-shell,
  wherein the at least one light-emitting device comprising a main body extending out of the casing, the candle container and the inner-shell and is at least partially embedded in the filling.

8. The photosensitive candle of claim 7, further comprising
  a candle container hole formed on the candle container base;
  a casing hole formed on the casing; and
  a removable cover for covering the candle container hole;
  wherein the candle container hole and the casing hole are substantially aligned with each other, such that the interior cavity of the casing is accessible by a user when the candle container is removed from the inner-shell and the removable cover is opened.

9. The photosensitive candle of claim 1, further comprising
  an inner container housed within the candle container, comprising an inner container base positioned above the casing of the lighting control component, wherein the candle component is disposed within the inner container;
  a light guiding channel attached to a defined area of the inner container base, comprising:
    a first portion disposed within the inner container, configured to accommodate a part of the wick and the second end of the optical fiber; and
    a second portion disposed outside the inner container and extending away from the inner container base, configured to accommodate at least a part of the photosensitive element of the light sensor;
  wherein the second end of the optical fiber and the photosensitive element are separated from each other by the defined area of the inner container base, and wherein the defined area of the inner container base is made of transparent material, and the first portion and the second portion of the light guiding channel are substantially aligned with each other, such that the light transmitted from the optical fiber are detectable by the photosensitive element.

10. The photosensitive candle of claim 1, wherein the at least one light-emitting device comprises at least two light strings with different colors.

11. A photosensitive candle, comprising:
(a) a candle container comprising a candle container base and a candle container opening opposite the candle container base;
(b) an inner container housed within the candle container, comprising an inner container base and an inner container opening opposite the inner container base;
(c) a candle component disposed in the inner container, comprising:
    a candle body filled within the inner container, having a top surface proximate to or substantially aligned with the inner container opening;
    a wick with an exposed portion protruding out of the top surface of the candle body; and
    an optical fiber embedded in the candle body and positioned juxtapose to the wick for transmitting flame lights of the wick, wherein the optical fiber comprises a first end proximate to the exposed portion of the wick and an opposing second end;
(d) a lighting control component disposed in the candle container, comprising:
    a casing attached to the candle container base and positioned below the inner container base, comprising an interior cavity;
    a controller disposed within the interior cavity;
    a power source connected with the controller and disposed within the interior cavity; and
    a light sensor connected to the controller, comprising a photosensitive element protruding outwardly from the casing towards the inner container base, wherein the photosensitive element is positioned proximate to the second end of the optical fiber to detect light transmitted therefrom;
(e) at least one light-emitting device with a connecting end and a main body, wherein the connecting end is connected to the controller and the main body extends out of the casing and the candle container; and
(f) a light guiding channel attached to a defined area of the inner container base, comprising:
    a first portion disposed within the inner container, configured to accommodate a part of the wick and the second end of the optical fiber; and
    a second portion disposed outside the inner container and extending away from the inner container base, configured to accommodate at least a part of the photosensitive element of the light sensor;
    wherein the second end of the optical fiber and the photosensitive element are separated from each other by the defined area of the inner container base, and wherein the defined area is made of substantially transparent material, and the first portion and the second portion are substantially aligned with each other, such that the light transmitted from the optical fiber are detectable by the photosensitive element;
wherein the controller is configured to receive light signals associated with the flame lights of the wick from the light sensor, and control the at least one light-emitting device based on the received light signals.

12. The photosensitive candle of claim 11, wherein the controller is further configured to:

(i) switch the at least one light-emitting device from an OFF state to an ON state if an intensity of the light signals is greater than a predetermined upper threshold;
(ii) once the at least one light-emitting device is switched to the ON state, maintain the at least one light-emitting device in the ON state if the intensity of the light signals is greater than a predetermined lower threshold;
(iii) if the intensity of the light signals becomes lesser than the predetermined lower threshold when the at least one light-emitting device is in the ON state, measure a length of time in which the intensity of the light signals is lesser than the predetermined lower threshold; and
    if the length of time is shorter than a predetermined period of time, maintain the at least one light-emitting device in the ON state;
    if the length of time is longer than the predetermined period of time, switch the at least one light-emitting device from the ON state to the OFF state; and
(iv) once the at least one light-emitting device is switched to the OFF state, maintain the at least one light-emitting device in the OFF state if the intensity of the light signals is lesser than the predetermined upper threshold.

13. The photosensitive candle of claim 11, further comprising a shell component including:
an outer-shell comprising an outer-shell base, wherein the outer-shell is configured to accommodate the candle container with the candle container base disposed on top of the outer-shell base; and
a filling that fills in a space between the candle container and the outer-shell,
wherein the main body of the at least one light-emitting device is at least partially embedded in the filling.

14. The photosensitive candle of claim 11, further comprising a shell component including:
an outer-shell comprising an outer-shell base;
an inner-shell comprising an inner-shell base, wherein the inner-shell is housed within the outer-shell with the inner-shell base disposed on top of the outer-shell base, and the inner-shell is configured to removably accommodate the candle container with the candle container base disposed on top of the inner-shell base; and
a filling that fills in a space between the inner-shell and the outer-shell,
wherein the at least one light-emitting device comprising a main body extending out of the casing, the candle container and the inner-shell and is at least partially embedded in the filling.

15. A photosensitive candle, comprising:
(a) a shell component including:
    an outer-shell comprising an outer-shell base;
    an inner-shell comprising an inner-shell base, wherein the inner-shell is housed within the outer-shell with the inner-shell base disposed on top of the outer-shell base;
    a filling that fills in a space between the inner-shell and the outer-shell;
(b) a candle container comprising a candle container base and a candle container opening opposite the candle container base, wherein the candle container is configured to be removably accommodated within the inner-shell with the candle container base disposed on top of the inner-shell base;
(c) an inner container housed within the candle container, comprising an inner container base and an inner container opening opposite the inner container base;

(d) a candle component disposed in the inner container, comprising:
  a candle body filled within the inner container, having a top surface proximate to or substantially aligned with the inner container opening;
  a wick with an exposed portion protruding out of the top surface of the candle body; and
  an optical fiber embedded in the candle body and positioned juxtapose to the wick for transmitting flame lights of the wick, wherein the optical fiber comprises a first end proximate to the exposed portion of the wick and an opposing second end;
(e) a lighting control component disposed in the candle container, comprising:
  a casing attached to the candle container base and positioned below the inner container base, comprising an interior cavity;
  a controller disposed within the interior cavity;
  a power source connected with the controller and disposed within the interior cavity; and
  a light sensor connected to the controller, comprising a photosensitive element protruding outwardly from the casing towards the inner container base, wherein the photosensitive element is positioned proximate to the second end of the optical fiber to detect light transmitted therefrom;
(f) at least one light-emitting device with a connecting end and a main body, wherein the connecting end is connected to the controller and the main body extends out of the casing, the candle container and the inner-shell and is at least partially embedded in the filling; and
(g) a light guiding channel attached to a defined area of the inner container base, comprising:
  a first portion disposed within the inner container, configured to accommodate a part of the wick and the second end of the optical fiber; and
  a second portion disposed outside the inner container and extending away from the inner container base, configured to accommodate at least a part of the photosensitive element of the light sensor;
wherein the second end of the optical fiber and the photosensitive element are separated from each other by the defined area of the inner container base, and wherein the defined area is made of substantially transparent material, and the first portion and the second portion are substantially aligned with each other, such that the light transmitted from the optical fiber are detectable by the photosensitive element;
wherein the controller is configured to receive light signals associated with the flame lights of the wick from the light sensor, and control the at least one light-emitting device based on the received light signals.

16. The photosensitive candle of claim 15, wherein the controller is further configured to:
(i) switch the at least one light-emitting device from an OFF state to an ON state if an intensity of the light signals is greater than a predetermined upper threshold;
(ii) once the at least one light-emitting device is switched to the ON state, maintain the at least one light-emitting device in the ON state if the intensity of the light signals is greater than a predetermined lower threshold;
(iii) if the intensity of the light signals becomes lesser than the predetermined lower threshold when the at least one light-emitting device is in the ON state, measure a length of time in which the intensity of the light signals is lesser than the predetermined lower threshold; and
  if the length of time is shorter than a predetermined period of time, maintain the at least one light-emitting device in the ON state;
  if the length of time is longer than the predetermined period of time, switch the at least one light-emitting device from the ON state to the OFF state; and
(iv) once the at least one light-emitting device is switched to the OFF state, maintain the at least one light-emitting device in the OFF state if the intensity of the light signals is lesser than the predetermined upper threshold.

17. The photosensitive candle of claim 16, wherein the lighting control component further comprises an analog-digital converting module connected to the controller,
wherein the analog-digital converting module is configured to:
  (i) analyze and process the light signals to generate digital signals, wherein the digital signals represent the intensity of the light signals; and
  (ii) transmit the digital signals to the controller,
wherein the controller is further configured to control an illumination of the at least one light-emitting device based on the digital signals received from the analog-digital converting module when the at least one light-emitting device is in the ON state.

18. The photosensitive candle of claim 16, wherein the lighting control component further comprises a memory that stores a preset program, and the controller is further configured to control an illumination of the at least one light-emitting device based on the preset program when the at least one light-emitting device is in the ON state.

19. The photosensitive candle of claim 15, further comprising a candle container hole formed on the candle container base;
  a casing hole formed on the casing; and
  a removable cover for covering the candle container hole;
  wherein the candle container hole and the casing hole are substantially aligned with each other, such that the interior cavity of the casing is accessible by a user when the candle container is removed from the inner-shell and the removable cover is opened.

20. The photosensitive candle of claim 15, wherein the at least one light-emitting device comprises at least two light strings with different colors.

* * * * *